(12) United States Patent
Suzuki et al.

(10) Patent No.: US 10,812,134 B2
(45) Date of Patent: Oct. 20, 2020

(54) WIRELESS COMMUNICATION APPARATUS, WIRELESS COMMUNICATION SYSTEM, WIRELESS COMMUNICATION METHOD, CONTROL CIRCUIT, AND RECORDING MEDIUM

(71) Applicant: MITSUBISHI ELECTRIC CORPORATION, Tokyo (JP)

(72) Inventors: Kazumasa Suzuki, Tokyo (JP); Kazuaki Ishioka, Tokyo (JP); Hiroyasu Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/624,651

(22) PCT Filed: Jul. 19, 2017

(86) PCT No.: PCT/JP2017/026136
§ 371 (c)(1),
(2) Date: Dec. 19, 2019

(87) PCT Pub. No.: WO2019/016898
PCT Pub. Date: Jan. 24, 2019

(65) Prior Publication Data
US 2020/0186187 A1 Jun. 11, 2020

(51) Int. Cl.
*H04B 1/715* (2011.01)
*H04W 4/42* (2018.01)
(Continued)

(52) U.S. Cl.
CPC .............. *H04B 1/715* (2013.01); *H04W 4/42* (2018.02); *H04W 16/10* (2013.01); *H04W 72/0453* (2013.01); *H04B 2001/7154* (2013.01)

(58) Field of Classification Search
CPC . H04B 1/715; H04B 2001/7154; H04W 4/42; H04W 16/10; H04W 72/0453
See application file for complete search history.

(56) References Cited

U.S. PATENT DOCUMENTS 8,477,711 B2 * 7/2013 Geiger ................ H04W 72/082
370/229
9,294,928 B2 * 3/2016 Hasegawa ............ H04B 1/7143
(Continued)

FOREIGN PATENT DOCUMENTS

JP  2002-191069 A  7/2002
JP  2009-171078 A  7/2009
(Continued)

OTHER PUBLICATIONS

Extended European Search Report issued in corresponding European Application No. 17918407.2 dated May 20, 2020.
(Continued)

*Primary Examiner* — Freshteh N Aghdam
(74) *Attorney, Agent, or Firm* — Birch, Stewart, Kolasch & Birch, LLP

(57) ABSTRACT

A wireless communication apparatus includes a channel-usage selection unit to select one frequency channel for each time slot from a plurality of predetermined candidate frequency channels, and a wireless communication unit to perform wireless communication by using the frequency channel selected by the channel-usage selection unit. The channel-usage selection unit selects a frequency channel that is different from a frequency channel to be used in a same time slot by an adjacent cell located at a cell interval, equal to or smaller than the predetermined first number of cells, from a cell used for the wireless communication, and allows the frequency channel selected to overlap with the frequency channel to be used in the same time slot by a remote cell located at a cell interval, greater than the first number of cells
(Continued)

and equal to or smaller than the number of the candidate frequency channels, from a cell used for the wireless communication.

13 Claims, 17 Drawing Sheets

(51) Int. Cl.
*H04W 16/10* (2009.01)
*H04W 72/04* (2009.01)

(56) References Cited

U.S. PATENT DOCUMENTS

| | | | |
|---|---|---|---|
| 10,498,471 B2 | 12/2019 | Suzuki et al. | |
| 2006/0217063 A1* | 9/2006 | Parthasarathy | H04L 9/0891 455/39 |
| 2014/0348124 A1 | 11/2014 | Hasegawa et al. | |
| 2015/0215935 A1* | 7/2015 | Taira | H04W 72/0446 370/336 |
| 2015/0263773 A1* | 9/2015 | Suzuki | H04W 74/0808 375/219 |
| 2018/0205650 A1* | 7/2018 | Cooper | B61L 15/0027 |
| 2018/0334179 A1* | 11/2018 | Aoyama | B61L 15/0018 |
| 2019/0028214 A1 | 1/2019 | Suzuki et al. | |

FOREIGN PATENT DOCUMENTS

| | | |
|---|---|---|
| JP | 6012916 B1 | 10/2016 |
| KR | 10 2016 0005868 A | 1/2016 |
| WO | WO 2014/045402 A1 | 3/2014 |

OTHER PUBLICATIONS

Flaminio Borgonovo et al: "Capture-Division Packet Access for Wireless Personal Communications", IEEE Journal on Selected Areas in Communications, IEEE Service Center, Piscataway, US, vol. 14, No. 4, May 1, 1996.

* cited by examiner

FIG.10

| | | \multicolumn{16}{c}{TIME SLOT} |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| CELL | 0  | 0  | 3  | 6  | 9  | 12 | 15 | 2  | 5  | 8  | 11 | 14 | 1  | 4  | 7  | 10 | 13 |
|      | 1  | 4  | 7  | 10 | 13 | 0  | 3  | 6  | 9  | 12 | 15 | 2  | 5  | 8  | 11 | 14 | 1  |
|      | 2  | 8  | 11 | 14 | 1  | 4  | 7  | 10 | 13 | 0  | 3  | 6  | 9  | 12 | 15 | 2  | 5  |
|      | 3  | 12 | 15 | 2  | 5  | 8  | 11 | 14 | 1  | 4  | 7  | 10 | 13 | 0  | 3  | 6  | 9  |
|      | 4  | 1  | 4  | 7  | 10 | 13 | 0  | 3  | 6  | 9  | 12 | 15 | 2  | 5  | 8  | 11 | 14 |
|      | 5  | 5  | 8  | 11 | 14 | 1  | 4  | 7  | 10 | 13 | 0  | 3  | 6  | 9  | 12 | 15 | 2  |
|      | 6  | 9  | 12 | 15 | 2  | 5  | 8  | 11 | 14 | 1  | 4  | 7  | 10 | 13 | 0  | 3  | 6  |
|      | 7  | 13 | 0  | 3  | 6  | 9  | 12 | 15 | 2  | 5  | 8  | 11 | 14 | 1  | 4  | 7  | 10 |
|      | 8  | 3  | 6  | 9  | 12 | 15 | 2  | 5  | 8  | 11 | 14 | 1  | 4  | 7  | 10 | 13 | 0  |
|      | 9  | 7  | 10 | 13 | 0  | 3  | 6  | 9  | 12 | 15 | 2  | 5  | 8  | 11 | 14 | 1  | 4  |
|      | 10 | 11 | 14 | 1  | 4  | 7  | 10 | 13 | 0  | 3  | 6  | 9  | 12 | 15 | 2  | 5  | 8  |
|      | 11 | 15 | 2  | 5  | 8  | 11 | 14 | 1  | 4  | 7  | 10 | 13 | 0  | 3  | 6  | 9  | 12 |
|      | 12 | 2  | 5  | 8  | 11 | 14 | 1  | 4  | 7  | 10 | 13 | 0  | 3  | 6  | 9  | 12 | 15 |
|      | 13 | 6  | 9  | 12 | 15 | 2  | 5  | 8  | 11 | 14 | 1  | 4  | 7  | 10 | 13 | 0  | 3  |
|      | 14 | 10 | 13 | 0  | 3  | 6  | 9  | 12 | 15 | 2  | 5  | 8  | 11 | 14 | 1  | 4  | 7  |
|      | 15 | 14 | 1  | 4  | 7  | 10 | 13 | 0  | 3  | 6  | 9  | 12 | 15 | 2  | 5  | 8  | 11 |
|      | 16 | 0  | 7  | 14 | 5  | 12 | 3  | 10 | 1  | 8  | 15 | 6  | 13 | 4  | 11 | 2  | 9  |
|      | 17 | 4  | 11 | 2  | 9  | 0  | 7  | 14 | 5  | 12 | 3  | 10 | 1  | 8  | 15 | 6  | 13 |
|      | 18 | 8  | 15 | 6  | 13 | 4  | 11 | 2  | 9  | 0  | 7  | 14 | 5  | 12 | 3  | 10 | 1  |
|      | 19 | 12 | 3  | 10 | 1  | 8  | 15 | 6  | 13 | 4  | 11 | 2  | 9  | 0  | 7  | 14 | 5  |
|      | 20 | 1  | 8  | 15 | 6  | 13 | 4  | 11 | 2  | 9  | 0  | 7  | 14 | 5  | 12 | 3  | 10 |
|      | 21 | 5  | 12 | 3  | 10 | 1  | 8  | 15 | 6  | 13 | 4  | 11 | 2  | 9  | 0  | 7  | 14 |
|      | 22 | 9  | 0  | 7  | 14 | 5  | 12 | 3  | 10 | 1  | 8  | 15 | 6  | 13 | 4  | 11 | 2  |
|      | 23 | 13 | 4  | 11 | 2  | 9  | 0  | 7  | 14 | 5  | 12 | 3  | 10 | 1  | 8  | 15 | 6  |
|      | 24 | 3  | 10 | 1  | 8  | 15 | 6  | 13 | 4  | 11 | 2  | 9  | 0  | 7  | 14 | 5  | 12 |
|      | 25 | 7  | 14 | 5  | 12 | 3  | 10 | 1  | 8  | 15 | 6  | 13 | 4  | 11 | 2  | 9  | 0  |
|      | 26 | 11 | 2  | 9  | 0  | 7  | 14 | 5  | 12 | 3  | 10 | 1  | 8  | 15 | 6  | 13 | 4  |
|      | 27 | 15 | 6  | 13 | 4  | 11 | 2  | 9  | 0  | 7  | 14 | 5  | 12 | 3  | 10 | 1  | 8  |
|      | 28 | 2  | 9  | 0  | 7  | 14 | 5  | 12 | 3  | 10 | 1  | 8  | 15 | 6  | 13 | 4  | 11 |
|      | 29 | 6  | 13 | 4  | 11 | 2  | 9  | 0  | 7  | 14 | 5  | 12 | 3  | 10 | 1  | 8  | 15 |
|      | 30 | 10 | 1  | 8  | 15 | 6  | 13 | 4  | 11 | 2  | 9  | 0  | 7  | 14 | 5  | 12 | 3  |
|      | 31 | 14 | 5  | 12 | 3  | 10 | 1  | 8  | 15 | 6  | 13 | 4  | 11 | 2  | 9  | 0  | 7  |

FIG.14

| CELL | | TIME SLOT | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| | 0 | 0 | 3 | 6 | 9 | 12 | 15 | 2 | 5 | 8 | 11 | 14 | 1 | 4 | 7 | 10 | 13 |
| | 1 | 4 | 7 | 10 | 13 | 0 | 3 | 6 | 9 | 12 | 15 | 2 | 5 | 8 | 11 | 14 | 1 |
| | 2 | 8 | 11 | 14 | 1 | 4 | 7 | 10 | 13 | 0 | 3 | 6 | 9 | 12 | 15 | 2 | 5 |
| | 3 | 12 | 15 | 2 | 5 | 8 | 11 | 14 | 1 | 4 | 7 | 10 | 13 | 0 | 3 | 6 | 9 |
| | 4 | 1 | 4 | 7 | 10 | 13 | 0 | 3 | 6 | 9 | 12 | 15 | 2 | 5 | 8 | 11 | 14 |
| | 5 | 5 | 8 | 11 | 14 | 1 | 4 | 7 | 10 | 13 | 0 | 3 | 6 | 9 | 12 | 15 | 2 |
| | 6 | 9 | 12 | 15 | 2 | 5 | 8 | 11 | 14 | 1 | 4 | 7 | 10 | 13 | 0 | 3 | 6 |
| | 7 | 13 | 0 | 3 | 6 | 9 | 12 | 15 | 2 | 5 | 8 | 11 | 14 | 1 | 4 | 7 | 10 |
| | 8 | 3 | 6 | 9 | 12 | 15 | 2 | 5 | 8 | 11 | 14 | 1 | 4 | 7 | 10 | 13 | 0 |
| | 9 | 7 | 10 | 13 | 0 | 3 | 6 | 9 | 12 | 15 | 2 | 5 | 8 | 11 | 14 | 1 | 4 |
| | 10 | 11 | 14 | 1 | 4 | 7 | 10 | 13 | 0 | 3 | 6 | 9 | 12 | 15 | 2 | 5 | 8 |
| | 11 | 15 | 2 | 5 | 8 | 11 | 14 | 1 | 4 | 7 | 10 | 13 | 0 | 3 | 6 | 9 | 12 |
| | 12 | 2 | 5 | 8 | 11 | 14 | 1 | 4 | 7 | 10 | 13 | 0 | 3 | 6 | 9 | 12 | 15 |
| | 13 | 6 | 9 | 12 | 15 | 2 | 5 | 8 | 11 | 14 | 1 | 4 | 7 | 10 | 13 | 0 | 3 |
| | 14 | 10 | 13 | 0 | 3 | 6 | 9 | 12 | 15 | 2 | 5 | 8 | 11 | 14 | 1 | 4 | 7 |
| | 15 | 14 | 1 | 4 | 7 | 10 | 13 | 0 | 3 | 6 | 9 | 12 | 15 | 2 | 5 | 8 | 11 |

FIG.15

| | | \multicolumn{16}{c}{TIME SLOT} |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| CELL | 0 | 3 | 10 | 1 | 8 | 15 | 6 | 13 | 4 | 11 | 2 | 9 | 0 | 7 | 14 | 5 | 12 |
| | 1 | 7 | 14 | 5 | 12 | 3 | 10 | 1 | 8 | 15 | 6 | 13 | 4 | 11 | 2 | 9 | 0 |
| | 2 | 11 | 2 | 9 | 0 | 7 | 14 | 5 | 12 | 3 | 10 | 1 | 8 | 15 | 6 | 13 | 4 |
| | 3 | 15 | 6 | 13 | 4 | 11 | 2 | 9 | 0 | 7 | 14 | 5 | 12 | 3 | 10 | 1 | 8 |
| | 4 | 2 | 9 | 0 | 7 | 14 | 5 | 12 | 3 | 10 | 1 | 8 | 15 | 6 | 13 | 4 | 11 |
| | 5 | 6 | 13 | 4 | 11 | 2 | 9 | 0 | 7 | 14 | 5 | 12 | 3 | 10 | 1 | 8 | 15 |
| | 6 | 10 | 1 | 8 | 15 | 6 | 13 | 4 | 11 | 2 | 9 | 0 | 7 | 14 | 5 | 12 | 3 |
| | 7 | 14 | 5 | 12 | 3 | 10 | 1 | 8 | 15 | 6 | 13 | 4 | 11 | 2 | 9 | 0 | 7 |
| | 8 | 0 | 7 | 14 | 5 | 12 | 3 | 10 | 1 | 8 | 15 | 6 | 13 | 4 | 11 | 2 | 9 |
| | 9 | 4 | 11 | 2 | 9 | 0 | 7 | 14 | 5 | 12 | 3 | 10 | 1 | 8 | 15 | 6 | 13 |
| | 10 | 8 | 15 | 6 | 13 | 4 | 11 | 2 | 9 | 0 | 7 | 14 | 5 | 12 | 3 | 10 | 1 |
| | 11 | 12 | 3 | 10 | 1 | 8 | 15 | 6 | 13 | 4 | 11 | 2 | 9 | 0 | 7 | 14 | 5 |
| | 12 | 1 | 8 | 15 | 6 | 13 | 4 | 11 | 2 | 9 | 0 | 7 | 14 | 5 | 12 | 3 | 10 |
| | 13 | 5 | 12 | 3 | 10 | 1 | 8 | 15 | 6 | 13 | 4 | 11 | 2 | 9 | 0 | 7 | 14 |
| | 14 | 9 | 0 | 7 | 14 | 5 | 12 | 3 | 10 | 1 | 8 | 15 | 6 | 13 | 4 | 11 | 2 |
| | 15 | 13 | 4 | 11 | 2 | 9 | 0 | 7 | 14 | 5 | 12 | 3 | 10 | 1 | 8 | 15 | 6 |

FIG.16

| CELL | TIME SLOT | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 3 | 6 | 9 | 12 | 15 | 2 | 5 | 8 | 11 | 14 | 1 | 4 | 7 | 10 | 13 |
| 1 | 4 | 7 | 10 | 13 | 0 | 3 | 6 | 9 | 12 | 15 | 2 | 5 | 8 | 11 | 14 | 1 |
| 2 | 8 | 11 | 14 | 1 | 4 | 7 | 10 | 13 | 0 | 3 | 6 | 9 | 12 | 15 | 2 | 5 |
| 3 | 12 | 15 | 2 | 5 | 8 | 11 | 14 | 1 | 4 | 7 | 10 | 13 | 0 | 3 | 6 | 9 |
| 4 | 1 | 4 | 7 | 10 | 13 | 0 | 3 | 6 | 9 | 12 | 15 | 2 | 5 | 8 | 11 | 14 |
| 5 | 5 | 8 | 11 | 14 | 1 | 4 | 7 | 10 | 13 | 0 | 3 | 6 | 9 | 12 | 15 | 2 |
| 6 | 9 | 12 | 15 | 2 | 5 | 8 | 11 | 14 | 1 | 4 | 7 | 10 | 13 | 0 | 3 | 6 |
| 7 | 13 | 0 | 3 | 6 | 9 | 12 | 15 | 2 | 5 | 8 | 11 | 14 | 1 | 4 | 7 | 10 |
| 8 | 3 | 6 | 9 | 12 | 15 | 2 | 5 | 8 | 11 | 14 | 1 | 4 | 7 | 10 | 13 | 0 |
| 9 | 7 | 10 | 13 | 0 | 3 | 6 | 9 | 12 | 15 | 2 | 5 | 8 | 11 | 14 | 1 | 4 |
| 10 | 11 | 14 | 1 | 4 | 7 | 10 | 13 | 0 | 3 | 6 | 9 | 12 | 15 | 2 | 5 | 8 |
| 11 | 15 | 2 | 5 | 8 | 11 | 14 | 1 | 4 | 7 | 10 | 13 | 0 | 3 | 6 | 9 | 12 |
| 12 | 2 | 5 | 8 | 11 | 14 | 1 | 4 | 7 | 10 | 13 | 0 | 3 | 6 | 9 | 12 | 15 |
| 13 | 6 | 9 | 12 | 15 | 2 | 5 | 8 | 11 | 14 | 1 | 4 | 7 | 10 | 13 | 0 | 3 |
| 14 | 10 | 13 | 0 | 3 | 6 | 9 | 12 | 15 | 2 | 5 | 8 | 11 | 14 | 1 | 4 | 7 |
| 15 | 14 | 1 | 4 | 7 | 10 | 13 | 0 | 3 | 6 | 9 | 12 | 15 | 2 | 5 | 8 | 11 |
| 16 | 0 | 11 | 6 | 1 | 12 | 7 | 2 | 13 | 8 | 3 | 14 | 9 | 4 | 15 | 10 | 5 |
| 17 | 4 | 15 | 10 | 5 | 0 | 11 | 6 | 1 | 12 | 7 | 2 | 13 | 8 | 3 | 14 | 9 |
| 18 | 8 | 3 | 14 | 9 | 4 | 15 | 10 | 5 | 0 | 11 | 6 | 1 | 12 | 7 | 2 | 13 |
| 19 | 12 | 7 | 2 | 13 | 8 | 3 | 14 | 9 | 4 | 15 | 10 | 5 | 0 | 11 | 6 | 1 |
| 20 | 1 | 12 | 7 | 2 | 13 | 8 | 3 | 14 | 9 | 4 | 15 | 10 | 5 | 0 | 11 | 6 |
| 21 | 5 | 0 | 11 | 6 | 1 | 12 | 7 | 2 | 13 | 8 | 3 | 14 | 9 | 4 | 15 | 10 |
| 22 | 9 | 4 | 15 | 10 | 5 | 0 | 11 | 6 | 1 | 12 | 7 | 2 | 13 | 8 | 3 | 14 |
| 23 | 13 | 8 | 3 | 14 | 9 | 4 | 15 | 10 | 5 | 0 | 11 | 6 | 1 | 12 | 7 | 2 |
| 24 | 3 | 14 | 9 | 4 | 15 | 10 | 5 | 0 | 11 | 6 | 1 | 12 | 7 | 2 | 13 | 8 |
| 25 | 7 | 2 | 13 | 8 | 3 | 14 | 9 | 4 | 15 | 10 | 5 | 0 | 11 | 6 | 1 | 12 |
| 26 | 11 | 6 | 1 | 12 | 7 | 2 | 13 | 8 | 3 | 14 | 9 | 4 | 15 | 10 | 5 | 0 |
| 27 | 15 | 10 | 5 | 0 | 11 | 6 | 1 | 12 | 7 | 2 | 13 | 8 | 3 | 14 | 9 | 4 |
| 28 | 2 | 13 | 8 | 3 | 14 | 9 | 4 | 15 | 10 | 5 | 0 | 11 | 6 | 1 | 12 | 7 |
| 29 | 6 | 1 | 12 | 7 | 2 | 13 | 8 | 3 | 14 | 9 | 4 | 15 | 10 | 5 | 0 | 11 |
| 30 | 10 | 5 | 0 | 11 | 6 | 1 | 12 | 7 | 2 | 13 | 8 | 3 | 14 | 9 | 4 | 15 |
| 31 | 14 | 9 | 4 | 15 | 10 | 5 | 0 | 11 | 6 | 1 | 12 | 7 | 2 | 13 | 8 | 3 |

FIG.17

| CELL | | TIME SLOT | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| | 0 | 3 | 10 | 1 | 8 | 15 | 6 | 13 | 4 | 11 | 2 | 9 | 0 | 7 | 14 | 5 | 12 |
| | 1 | 7 | 14 | 5 | 12 | 3 | 10 | 1 | 8 | 15 | 6 | 13 | 4 | 11 | 2 | 9 | 0 |
| | 2 | 11 | 2 | 9 | 0 | 7 | 14 | 5 | 12 | 3 | 10 | 1 | 8 | 15 | 6 | 13 | 4 |
| | 3 | 15 | 6 | 13 | 4 | 11 | 2 | 9 | 0 | 7 | 14 | 5 | 12 | 3 | 10 | 1 | 8 |
| | 4 | 2 | 9 | 0 | 7 | 14 | 5 | 12 | 3 | 10 | 1 | 8 | 15 | 6 | 13 | 4 | 11 |
| | 5 | 6 | 13 | 4 | 11 | 2 | 9 | 0 | 7 | 14 | 5 | 12 | 3 | 10 | 1 | 8 | 15 |
| | 6 | 10 | 1 | 8 | 15 | 6 | 13 | 4 | 11 | 2 | 9 | 0 | 7 | 14 | 5 | 12 | 3 |
| | 7 | 14 | 5 | 12 | 3 | 10 | 1 | 8 | 15 | 6 | 13 | 4 | 11 | 2 | 9 | 0 | 7 |
| | 8 | 0 | 7 | 14 | 5 | 12 | 3 | 10 | 1 | 8 | 15 | 6 | 13 | 4 | 11 | 2 | 9 |
| | 9 | 4 | 11 | 2 | 9 | 0 | 7 | 14 | 5 | 12 | 3 | 10 | 1 | 8 | 15 | 6 | 13 |
| | 10 | 8 | 15 | 6 | 13 | 4 | 11 | 2 | 9 | 0 | 7 | 14 | 5 | 12 | 3 | 10 | 1 |
| | 11 | 12 | 3 | 10 | 1 | 8 | 15 | 6 | 13 | 4 | 11 | 2 | 9 | 0 | 7 | 14 | 5 |
| | 12 | 1 | 8 | 15 | 6 | 13 | 4 | 11 | 2 | 9 | 0 | 7 | 14 | 5 | 12 | 3 | 10 |
| | 13 | 5 | 12 | 3 | 10 | 1 | 8 | 15 | 6 | 13 | 4 | 11 | 2 | 9 | 0 | 7 | 14 |
| | 14 | 9 | 0 | 7 | 14 | 5 | 12 | 3 | 10 | 1 | 8 | 15 | 6 | 13 | 4 | 11 | 2 |
| | 15 | 13 | 4 | 11 | 2 | 9 | 0 | 7 | 14 | 5 | 12 | 3 | 10 | 1 | 8 | 15 | 6 |
| | 16 | 3 | 2 | 1 | 0 | 15 | 14 | 13 | 12 | 11 | 10 | 9 | 8 | 7 | 6 | 5 | 4 |
| | 17 | 7 | 6 | 5 | 4 | 3 | 2 | 1 | 0 | 15 | 14 | 13 | 12 | 11 | 10 | 9 | 8 |
| | 18 | 11 | 10 | 9 | 8 | 7 | 6 | 5 | 4 | 3 | 2 | 1 | 0 | 15 | 14 | 13 | 12 |
| | 19 | 15 | 14 | 13 | 12 | 11 | 10 | 9 | 8 | 7 | 6 | 5 | 4 | 3 | 2 | 1 | 0 |
| | 20 | 2 | 1 | 0 | 15 | 14 | 13 | 12 | 11 | 10 | 9 | 8 | 7 | 6 | 5 | 4 | 3 |
| | 21 | 6 | 5 | 4 | 3 | 2 | 1 | 0 | 15 | 14 | 13 | 12 | 11 | 10 | 9 | 8 | 7 |
| | 22 | 10 | 9 | 8 | 7 | 6 | 5 | 4 | 3 | 2 | 1 | 0 | 15 | 14 | 13 | 12 | 11 |
| | 23 | 14 | 13 | 12 | 11 | 10 | 9 | 8 | 7 | 6 | 5 | 4 | 3 | 2 | 1 | 0 | 15 |
| | 24 | 0 | 15 | 14 | 13 | 12 | 11 | 10 | 9 | 8 | 7 | 6 | 5 | 4 | 3 | 2 | 1 |
| | 25 | 4 | 3 | 2 | 1 | 0 | 15 | 14 | 13 | 12 | 11 | 10 | 9 | 8 | 7 | 6 | 5 |
| | 26 | 8 | 7 | 6 | 5 | 4 | 3 | 2 | 1 | 0 | 15 | 14 | 13 | 12 | 11 | 10 | 9 |
| | 27 | 12 | 11 | 10 | 9 | 8 | 7 | 6 | 5 | 4 | 3 | 2 | 1 | 0 | 15 | 14 | 13 |
| | 28 | 1 | 0 | 15 | 14 | 13 | 12 | 11 | 10 | 9 | 8 | 7 | 6 | 5 | 4 | 3 | 2 |
| | 29 | 5 | 4 | 3 | 2 | 1 | 0 | 15 | 14 | 13 | 12 | 11 | 10 | 9 | 8 | 7 | 6 |
| | 30 | 9 | 8 | 7 | 6 | 5 | 4 | 3 | 2 | 1 | 0 | 15 | 14 | 13 | 12 | 11 | 10 |
| | 31 | 13 | 12 | 11 | 10 | 9 | 8 | 7 | 6 | 5 | 4 | 3 | 2 | 1 | 0 | 15 | 14 |

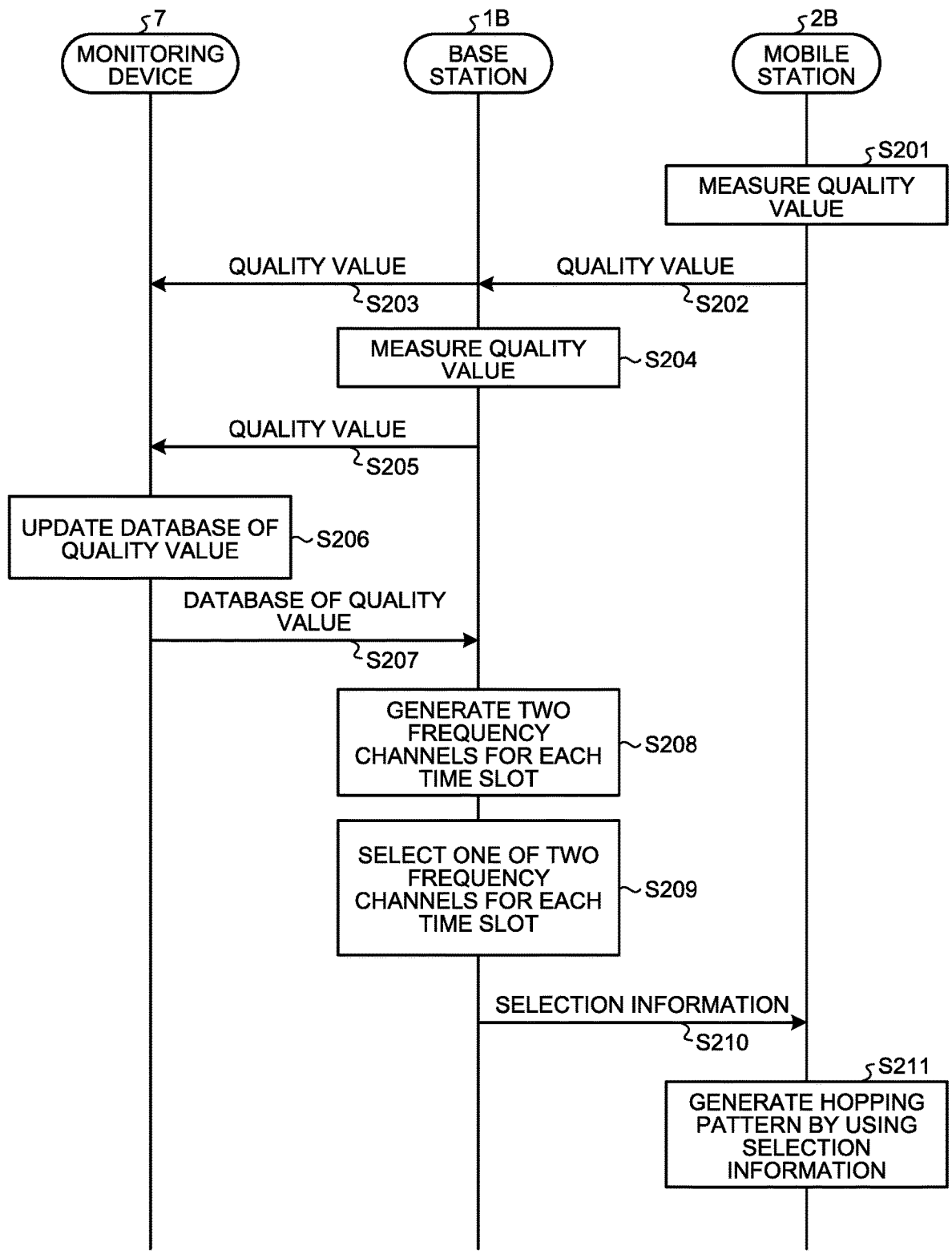

WIRELESS COMMUNICATION APPARATUS, WIRELESS COMMUNICATION SYSTEM, WIRELESS COMMUNICATION METHOD, CONTROL CIRCUIT, AND RECORDING MEDIUM

FIELD

The present invention relates to a wireless communication apparatus, a wireless communication system, and a wireless communication method that use frequency hopping.

BACKGROUND

In recent years, a wireless train control system is receiving attention. The wireless train control system performs wireless communication between a train and a ground station located along a railway track, and executes train traffic control, speed control, and the like on the basis of information transmitted through this wireless communication. The wireless train control system often uses the license-free 2.4 GHz ISM (Industry-Science-Medical) band which does not require a license for use of radio waves. Because the ISM band is widely used in systems such as wireless LAN (Local Area Network) and Bluetooth®, the spread spectrum technology is sometimes used in order to suppress interference with radio waves from other systems. The spread spectrum technology is a communication technology of spreading a signal over a wider band than the original signal band.

Patent Literature 1 discloses a wireless communication system using frequency hopping that is a type of the spread spectrum technology. The frequency hopping is a technology for wireless communication using a different frequency channel for each time slot. The system described in Patent Literature 1 prepares two hopping patterns in which frequency channels corresponding to the same time slot are different from each other, and selects a frequency channel to be used for each time slot from the two hopping patterns depending on the status of radio waves.

CITATION LIST

Patent Literature

Patent Literature 1: Japanese Patent Application Laid-open No. 2009-171078

SUMMARY

Technical Problem

However, the number of hopping patterns, in which frequency channels to be used simultaneously do not overlap in all the time slots, is equal to the number of candidate frequency channels to be used. For this reason, in the technique described in Patent Literature 1 mentioned above, the maximum interval between cells that use an identical hopping pattern is the number of candidate frequency channels. In a case of the wireless train control system described above where base stations are arranged along a railway track, visibility between the base stations is often good. This leads to a problem that the base station is more likely to be interfered with by radio waves from other base stations, which increases radio wave interference within the system.

The present invention has been achieved to solve the above problems, and an object of the present invention is to provide a wireless communication apparatus that is capable of suppressing radio wave interference within a system.

Solution to Problem

In order to solve the above problems and achieve the object, a wireless communication apparatus comprises: a channel-usage selection unit to select one frequency channel for each time slot from a plurality of predetermined candidate frequency channels; and a wireless communication unit to perform wireless communication by using the frequency channel selected by the channel-usage selection unit. The channel-usage selection unit selects a frequency channel that is different from a frequency channel to be used in a same time slot by an adjacent cell located at a cell interval, equal to or smaller than predetermined first number of cells, from a cell used for the wireless communication, and allows the frequency channel selected to overlap with the frequency channel to be used in a same time slot by a remote cell located at a cell interval, greater than the first number of cells and equal to or smaller than number of the candidate frequency channels, from a cell used for the wireless communication.

Advantageous Effects of Invention

The wireless communication apparatus according to the present invention has an effect where it is possible to suppress radio wave interference within a system.

BRIEF DESCRIPTION OF DRAWINGS

FIG. 10 is a diagram illustrating an example of a hopping pattern generated by a channel-usage selection unit illustrated in FIG. 2 and FIG. 4.

FIG. 14 is a diagram illustrating an example of a first hopping pattern generated by a channel-usage selection unit illustrated in FIG. 13.

FIG. 15 is a diagram illustrating an example of a second hopping pattern generated by the channel-usage selection unit illustrated in FIG. 13.

FIG. 16 is a diagram illustrating a modification of the first hopping pattern generated by the channel-usage selection unit illustrated in FIG. 13.

FIG. 17 is a diagram illustrating a modification of the second hopping pattern generated by the channel-usage selection unit illustrated in FIG. 13.

FIG. 19 is a sequence diagram illustrating an operation of the wireless communication system illustrated in FIG. 11.

DESCRIPTION OF EMBODIMENTS

A wireless communication apparatus, a wireless communication system, and a wireless communication method according to embodiments of the present invention will be described in detail below with reference to the accompanying drawings. The present invention is not limited to the embodiments.

First Embodiment

Figure 1:
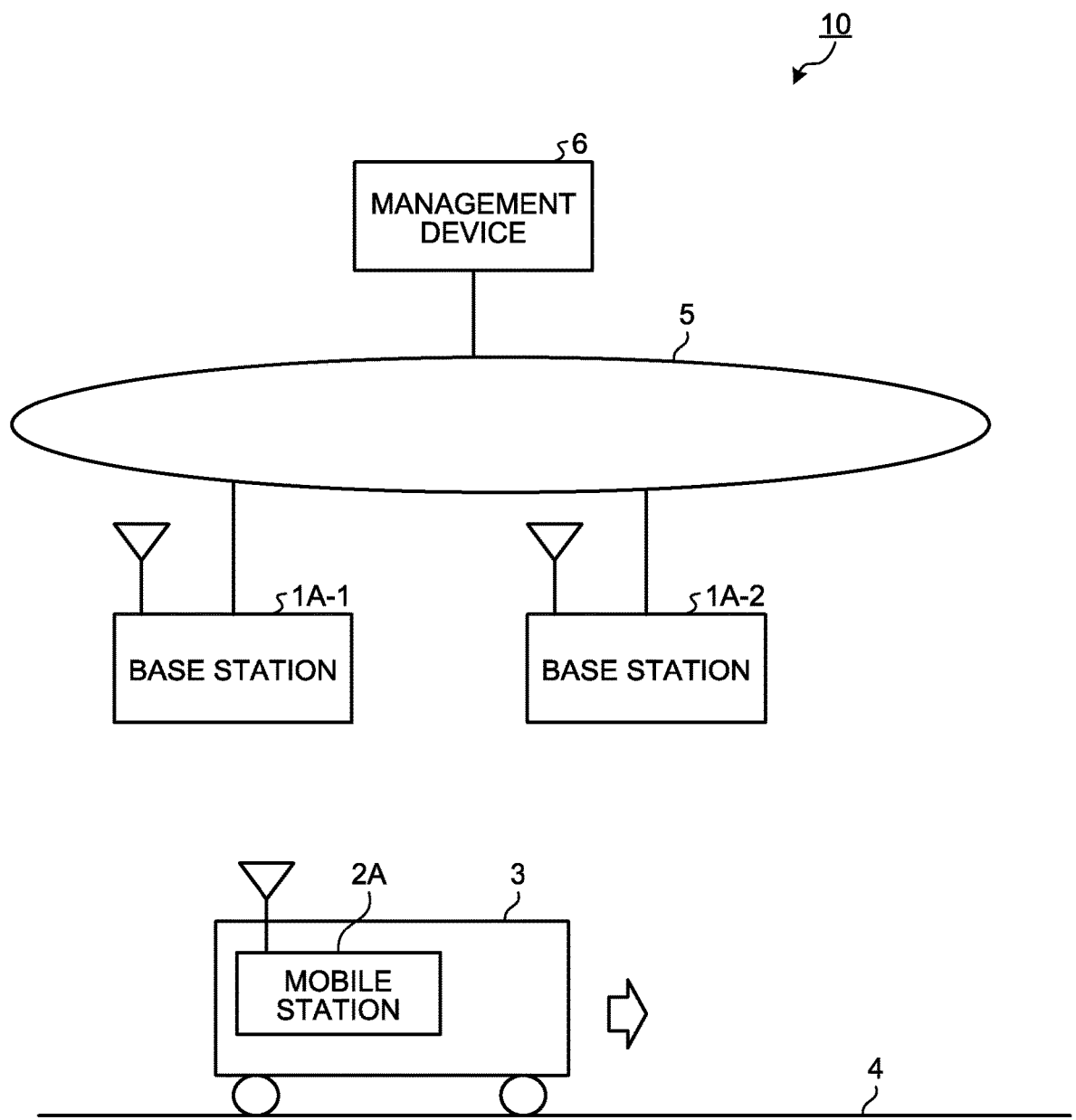
FIG. 1 is a diagram illustrating a configuration of a wireless communication system according to a first embodiment of the present invention.

FIG. 1 is a diagram illustrating a configuration of a wireless communication system 10 according to a first embodiment of the present invention. The wireless communication system 10 includes a base station 1A-1, a base station 1A-2, a mobile station 2A, a wired network 5, and a management device 6.

The base station 1A-1 and the base station 1A-2 are wireless communication apparatuses located along a predetermined path 4. Hereinafter, when the base station 1A-1 and the base station 1A-2 do not need to be particularly distinguished from each other, these base station 1A-1 and base station 1A-2 are collectively referred to as "base station 1A". The base station 1A is located along the path 4 such as a railway track. When the path 4 is a railway track, a vehicle 3 is a train. It is allowable that the path 4 is a road and the vehicle 3 is an automobile. A case where the path 4 is a railway track, and the vehicle 3 is a train is described below. The base station 1A is located along the path 4 at an interval of several tens of meters to several hundreds of meters.

The mobile station 2A is a wireless communication apparatus installed in the vehicle 3. The vehicle 3 moves along the path 4. While FIG. 1 illustrates a single vehicle 3 and a single mobile station 2A, the wireless communication system 10 includes a plurality of mobile stations 2A in practice.

A plurality of base stations 1A are connected to the wired network 5. The management device 6 is connected to the wired network 5 to manage the traffic operation of the vehicle 3. The management device 6 executes traffic control, speed control, and the like for the vehicle 3 on the basis of information transmitted through wireless communication between the base station 1A and the mobile station 2A. As compared to a conventional train traffic control method using fixed block sections, a wireless train control system does not require a track circuit, and accordingly can reduce introduction costs and maintenance costs. It is also possible for the wireless train control system to establish more flexible block sections without being restricted by fixed sections, and this makes it possible to increase the train traffic density, and can thus reduce costs for traffic operation.

A frequency band for wireless communication used by the wireless communication system 10 is a license-free frequency band that does not require a license for use of radio waves, such as an ISM band. The ISM band is used in a plurality of systems such as a wireless LAN and Bluetooth as described above. In general, in a cellular wireless communication system, the cell size is largely dependent on the transmission power of a transmitter and reception the sensitivity of a receiver, and a base station is located such that the reception level at the edge of the cell becomes close to the reception sensitivity. In contrast to this, the base station 1A according to the present embodiment can be located at such an interval that the reception level at the edge of the cell formed by the base station 1A becomes higher than the reception sensitivity, in order that the base station 1A can still perform communication even under the circumstances where the base station 1A is often interfered with by other systems. In order to reduce radio wave interference between systems, the base station 1A and the mobile station 2A perform wireless communication with each other by using frequency hopping, and change over the frequency channel to be used in each time slot. The mobile station 2A transmits the current position information of the vehicle 3 having the mobile station 2A installed therein to the base station 1A through wireless communication. The base station 1A transmits control information, generated by the management device 6 for traffic control, speed control, and the like for the vehicle 3, to the mobile station 2A through wireless communication. The control information includes a stop limit position that is a limit position at which each of the vehicles 3 can stop safely without collision with the vehicle 3 running ahead.

Radio wave interference from other systems can be reduced due to the configuration described above. However, if the base station 1A is located at such an interval that the reception level at the edge of the cell becomes higher than the reception sensitivity, radio waves from a remote base station 1A that uses the same frequency channel are more likely to enter as interference radio waves, which may cause radio wave interference within the system. The base station 1A is located along the path 4 with good visibility such as a railway track. Thus, this increases the likelihood of radio waves entering from a remote base station 1A that uses the same frequency channel as interference radio waves. In order to reduce radio wave interference within the system, it is desirable to distance the base stations 1A, having an identical hopping pattern using the same frequency channels in all the time slots, from each other.

Figure 2:
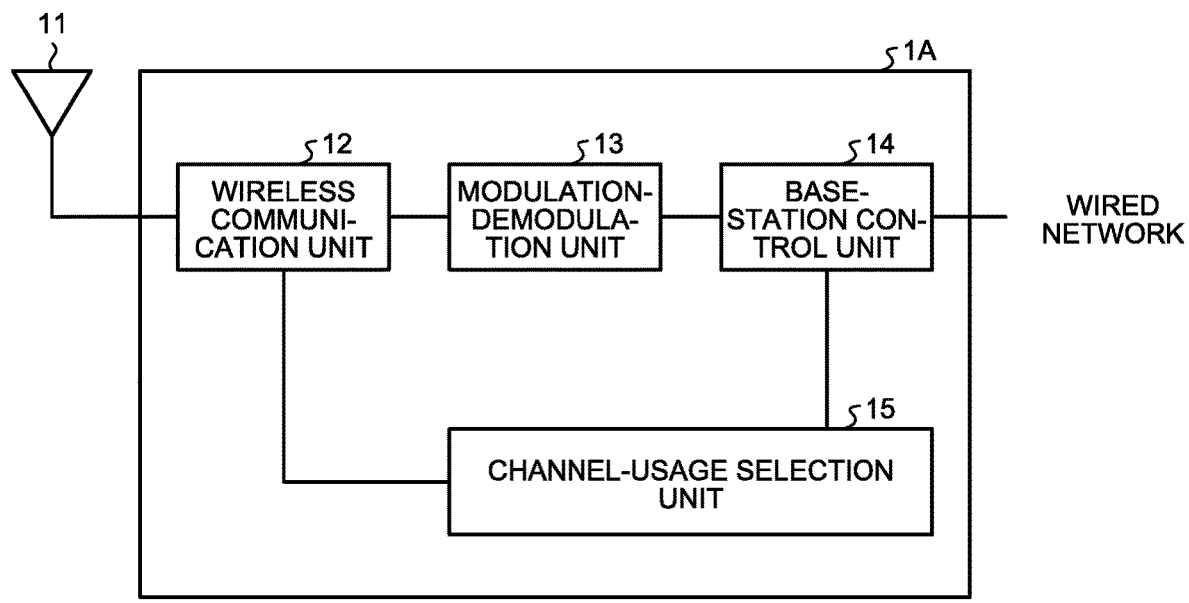
FIG. 2 is a diagram illustrating a functional configuration of a base station illustrated in FIG. 1.

FIG. 2 is a diagram illustrating a functional configuration of the base station 1A illustrated in FIG. 1. The base station 1A includes a communication antenna 11, a wireless communication unit 12, a modulation-demodulation unit 13, a base-station control unit 14, and a channel-usage selection unit 15.

The communication antenna 11 emits a wireless signal input from the wireless communication unit 12 into the air at the time of transmission, and receives a wireless signal propagated through the air and inputs the wireless signal to the wireless communication unit 12. The wireless communication unit 12 converts a digitally modulated signal input from the modulation-demodulation unit 13 to an analog signal at the time of transmission, and converts the frequency of the analog signal to a carrier frequency. The wireless communication unit 12 converts the frequency of an analog signal input from the communication antenna 11 to a base band frequency at the time of reception so as to perform wireless processing for converting the analog signal with the converted frequency to a digital signal. The wireless communication unit 12 performs the wireless processing by using a frequency channel selected by the channel-usage selection unit 15 to be described later.

The modulation-demodulation unit 13 performs coding processing and modulation processing on transmission data at the time of transmission, and performs demodulation processing and decoding processing on a received signal at the time of reception. The base-station control unit 14 controls transmission of data from the wired network 5 at the time of transmission, and controls reception data so as to be output to the wired network 5 at the time of reception. The channel-usage selection unit 15 selects a frequency channel to be used for wireless communication for each time slot on the basis of given conditions, and outputs a frequency-channel number that identifies the selected frequency channel to the wireless communication unit 12. The function of the channel-usage selection unit 15 is described later in detail.

Figure 3:
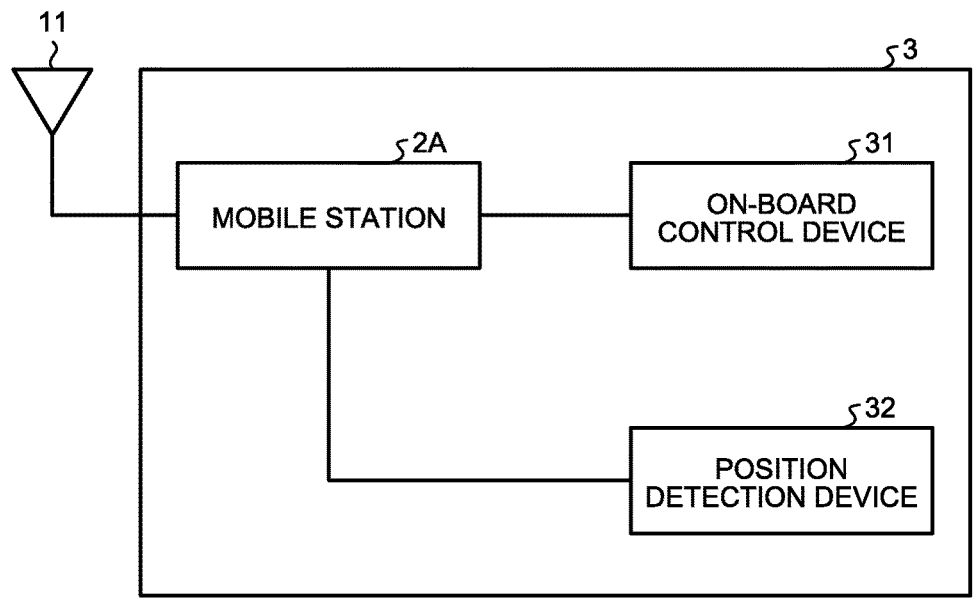
FIG. 3 is a diagram illustrating a schematic configuration of a vehicle illustrated in FIG. 1.

FIG. 3 is a diagram illustrating a schematic configuration of the vehicle 3 illustrated in FIG. 1. The vehicle 3 includes the mobile station 2A, an on-board control device 31, and a position detection device 32. The mobile station 2A includes the communication antenna 11. On the basis of data received by the mobile station 2A, the on-board control device 31 controls the vehicle 3, including stopping the vehicle 3 and changing the speed of the vehicle 3. The position detection device 32 detects the position of the vehicle 3. The position detection device 32 can detect the position of the vehicle 3 and generate position information in a given time cycle, and can output the generated position information to the mobile station 2A. It is allowable that the position detection device 32 obtains position information using a GPS (Global Positioning System) receiver, or calculates the current position of the vehicle 3 on the basis of starting-point position information transmitted from the base station 1A to the mobile station 2A, and on the basis of a movement distance obtained from a rate generator that measures the rotational speed of the axle.

Figure 4:
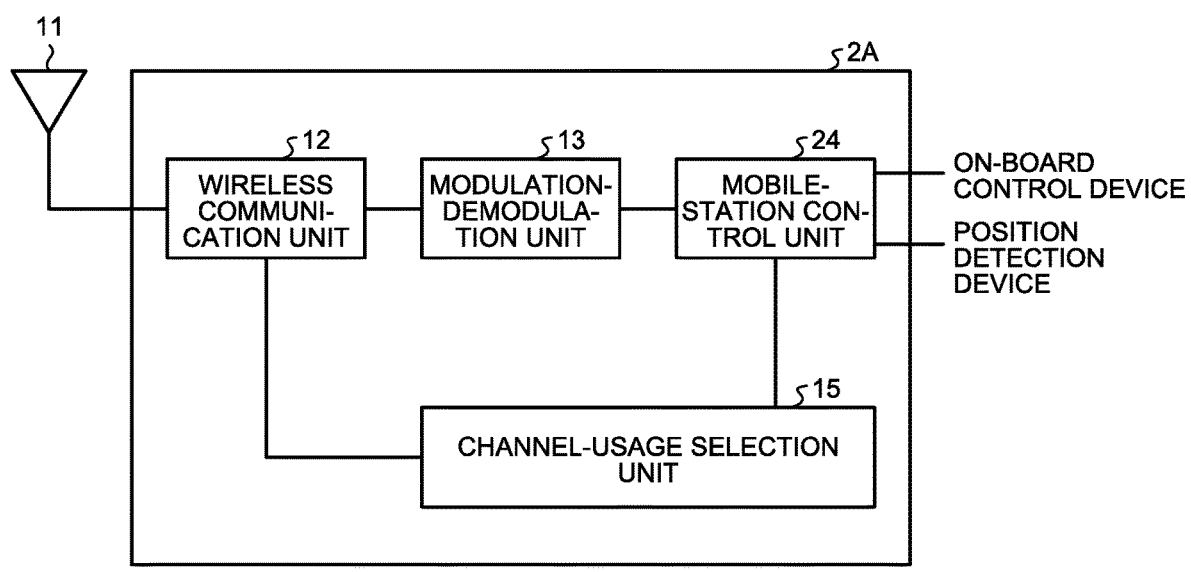
FIG. 4 is a diagram illustrating a functional configuration of a mobile station illustrated in FIG. 1.

FIG. 4 is a diagram illustrating a functional configuration of the mobile station 2A illustrated in FIG. 1. Constituent elements having the same functions as those of the base station 1A are denoted by like reference signs, and descriptions of the same functions are omitted. The mobile station 2A includes the communication antenna 11, the wireless communication unit 12, the modulation-demodulation unit 13, a mobile-station control unit 24, and the channel-usage selection unit 15. The mobile-station control unit 24 generates transmission data on the basis of position information output by the position detection device 32 at the time of transmission, and outputs the generated transmission data to the modulation-demodulation unit 13. The mobile-station control unit 24 outputs demodulated data output from the modulation-demodulation unit 13 to the on-board control device 31 at the time of reception.

Next, descriptions are given of the hardware configuration for implementing the functions of the base station 1A and the mobile station 2A. Each of the wireless communication unit 12 in the base station 1A and the mobile station 2A is constituted of an analog circuit that performs frequency conversion and the like, an analog-to-digital converter, a digital-to-analog converter, and the like. The modulation-demodulation unit 13, the base-station control unit 14, the channel-usage selection unit 15, and the mobile-station control unit 24 are equivalent to a processing circuit. It is allowable that this processing circuit is either dedicated hardware or a processing circuit that uses computer programs.

Figure 5:
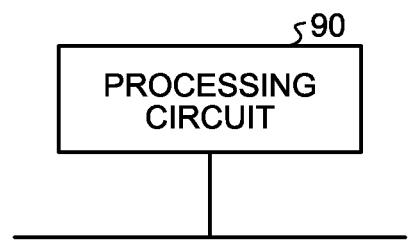
FIG. 5 is a diagram illustrating a first example of a processing circuit configuration for implementing the functions of the base station and the mobile station illustrated in FIG. 1.

When dedicated hardware is used, the processing circuit is a processing circuit 90 illustrated in FIG. 5. FIG. 5 is a diagram illustrating a first example of a processing circuit configuration for implementing the functions of the base station 1A and the mobile station 2A illustrated in FIG. 1.

The processing circuit 90 is any of a combined circuit, a programmed processor, a parallel-programmed processor, an ASIC (Application Specific Integrated Circuit), and an FPGA (Field-Programmable Gate Array), or is a combination thereof. A part or all of the functions of the modulation-demodulation unit 13, the base-station control unit 14, the channel-usage selection unit 15, and the mobile-station control unit 24 can be implemented by using the processing circuit 90 that is the dedicated hardware.

Figure 6:
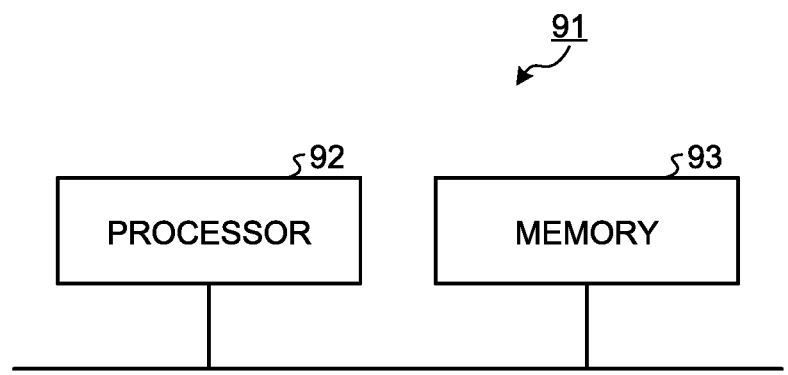
FIG. 6 is a diagram illustrating a second example of the processing circuit configuration for implementing the functions of the base station and the mobile station illustrated in FIG. 1.

When the processing circuit uses the computer programs, this processing circuit is a processing circuit 91 illustrated in FIG. 6. FIG. 6 is a diagram illustrating a second example of a processing circuit configuration for implementing the functions of the base station 1A and the mobile station 2A illustrated in FIG. 1. The processing circuit 91 includes a processor 92 and a memory 93.

The processor 92 is a CPU (Central Processing Unit), and is also referred to as a central processor, a processing device, a calculation device, a microprocessor, a microcomputer, a DSP (Digital Signal Processor), or the like.

The memory 93 is a nonvolatile or volatile semiconductor memory such as a RAM (Random Access Memory), a ROM (Read Only Memory), a flash memory, an EPROM (Erasable Programmable ROM), and an EEPROM (Electrically EPROM), a magnetic disk, or the like.

The processor 92 reads and executes the computer programs stored in the memory 93 so that a part or all of the functions of the modulation-demodulation unit 13, the base-station control unit 14, the channel-usage selection unit 15, and the mobile-station control unit 24 can be implemented by using the processing circuit 91 that includes the processor 92 and the memory 93. The memory 93 is also used as a temporary memory for the processor 92 to perform each processing.

Figure 7:
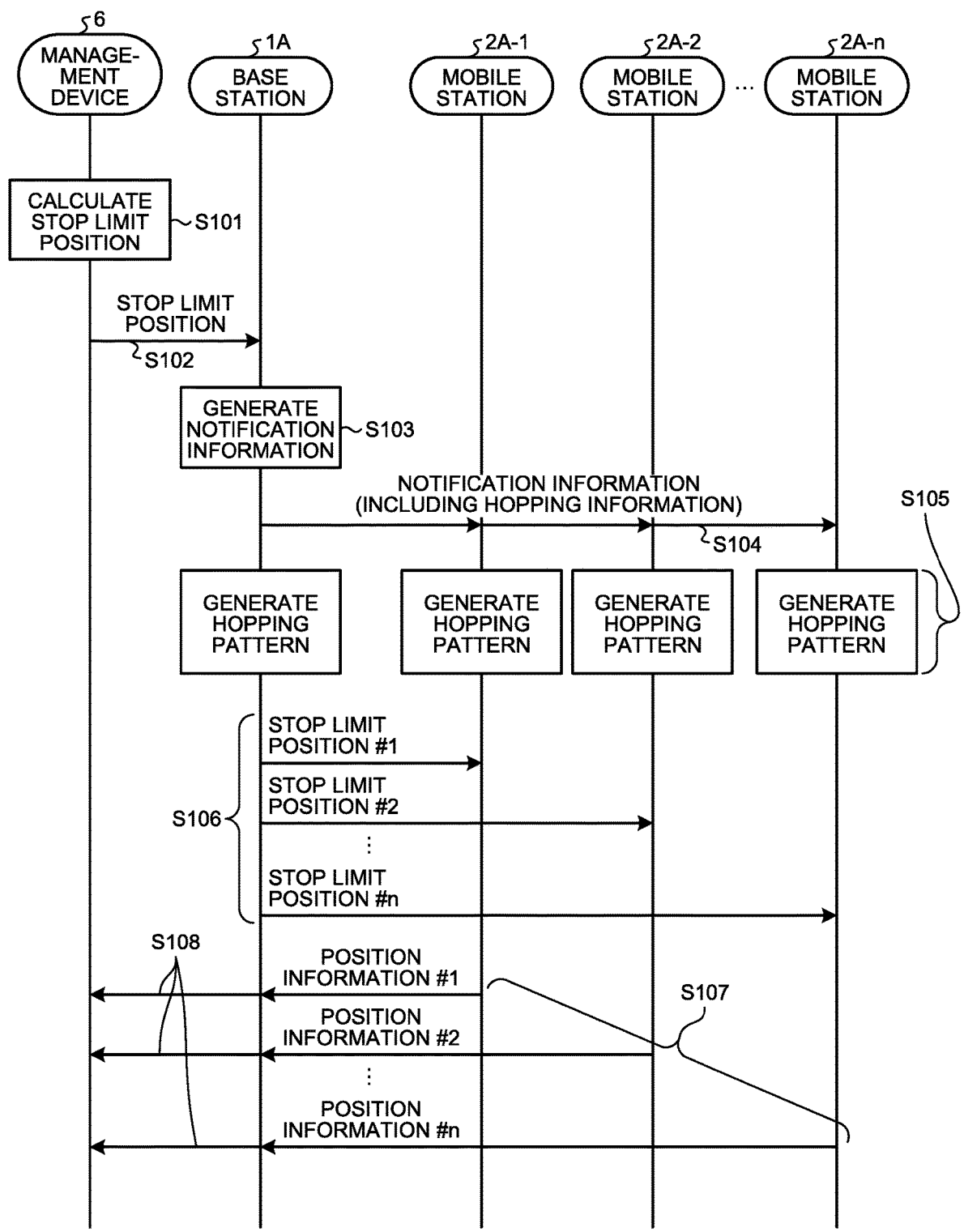
FIG. 7 is a sequence diagram illustrating an operation of the wireless communication system illustrated in FIG. 1.

Next, an operation of the wireless communication system 10 is described. FIG. 7 is a sequence diagram illustrating the operation of the wireless communication system 10 illustrated in FIG. 1. In FIG. 7, it is assumed that n mobile stations 2A are positioned within the cell of the base station 1A. Hereinafter, when a plurality of mobile stations 2A are to be distinguished from each other, the mobile stations 2A are individually referred to as a mobile station 2A-1, a mobile station 2A-2, . . . , a mobile station 2A-n.

The management device 6 calculates a stop limit position of the vehicles 3 (Step S101). A sequence of operations illustrated in FIG. 7 is repeatedly performed. The management device 6 obtains position information of the vehicles 3 from the mobile station 2A after the last sequence of operations is performed, and uses the obtained position information to calculate a stop limit position.

The management device 6 transmits the calculated stop limit position to the base station 1A (Step S102). When the base-station control unit 14 in the base station 1A receives the stop limit position transmitted by the management device 6, the base-station control unit 14 generates notification information that is information to be transmitted to all the mobile stations 2A positioned within the cell of the base station 1A, and outputs the notification information to the modulation-demodulation unit 13 (Step S103). The notification information includes hopping information, a frame number, a cell number, time-slot allocation information to the respective mobile stations 2A, and the like that are needed for the mobile station 2A to generate a hopping pattern in a frame.

The modulation-demodulation unit 13 in the base station 1A outputs the notification information having undergone modulation processing to the wireless communication unit 12. The wireless communication unit 12 transmits the notification information output by the modulation-demodulation unit 13 to all the mobile stations 2A positioned within the cell of the base station 1A (Step S104). At this time, the channel-usage selection unit 15 in the base station 1A selects a frequency channel to be used for transmitting notification information on the basis of hopping information having been notified to the mobile stations 2A by using the notification information included in the previously-transmitted frame. The wireless communication unit 12 uses the selected frequency channel to transmit the notification information.

When the wireless communication unit 12 in the base station 1A transmits the notification information, the channel-usage selection unit 15 in the base station 1A and the channel-usage selection unit 15 in the mobile station 2A respectively select a frequency channel to be used for each time slot to generate a hopping pattern (Step S105). At this time, the channel-usage selection unit 15 in the mobile station 2A can identify the time slot allocated to its own station on the basis of the hopping information included in the notification information received from the base station 1A. In the allocated time slot, the wireless communication unit 12 in the mobile station 2A performs wireless processing by using the same frequency channel as the frequency channel used by the base station 1A, so that the wireless communication unit 12 can perform wireless communication with the base station 1A. Step S105 in FIG. 7 is a step of generating a hopping pattern, at which a plurality of frequency channels to be used for respective time slots are collectively selected. However, the present invention is not limited to this example. Frequency channels to be used may be selected one by one for each time slot. The method for generating the hopping pattern is described later in detail.

The base-station control unit 14 in the base station 1A uses different time slots to respectively transmit a stop limit position of the vehicles 3 received from the management device 6 to the mobile stations 2A installed in the vehicles 3 (Step S106). Specifically, the base-station control unit 14 uses a time slot subsequent to the time slot, through which notification information has been transmitted, to transmit a stop limit position #1 of the mobile station 2A-1 to the mobile station 2A-1. Further, the base-station control unit 14 uses the next time slot to transmit a stop limit position #2 of the mobile station 2A-2 to the mobile station 2A-2. The same process is repeated until a stop limit position # n of the n-th mobile station 2A-n is transmitted to the mobile station 2A-n.

Subsequently to the transmission of the stop limit positions, each mobile station 2A uses a time slot allocated to its own station to transmit position information indicating the current position of the mobile station 2A, that is, position information of the vehicle 3 having each mobile station 2A installed therein to the base station 1A (Step S107). Specifically, the mobile station 2A-1 uses a time slot subsequent to the time slot, through which the stop limit position # n has been transmitted, to transmit position information #1 of the mobile station 2A-1 to the base station 1A. The mobile station 2A-2 transmits position information #2 of the mobile station 2A-2 to the base station 1A. The same process is repeated until the mobile station 2A-n transmits position information # n to the base station 1A. When the base station 1A receives the position information from the mobile stations 2A, the base station 1A transmits the received position information to the management device 6 through the wired network 5 (Step S108).

Because the operation illustrated in FIG. 7 is repeatedly performed, the position information transmitted to the management device 6 at Step S108 is used by the management device 6 to calculate a stop limit position at Step S101 in the next sequence of operations. A sequence of operations illustrated in FIG. 7 is performed in a time cycle of approximately several hundreds of milliseconds. Due to this configuration, the stop limit position is updated in a given cycle, which makes train operation possible. If update of the stop limit position is discontinued due to some problems, the on-board control device 31 controls the vehicle 3 to be stopped at the point in time when update of the stop limit position is discontinued. When the vehicle 3 moves and correspondingly the mobile station 2A is positioned within the cell of an adjacent base station 1A, the mobile-station control unit 24 in the mobile station 2A performs a handover process of changing over the base station 1A as a communication counterpart.

Figure 8:
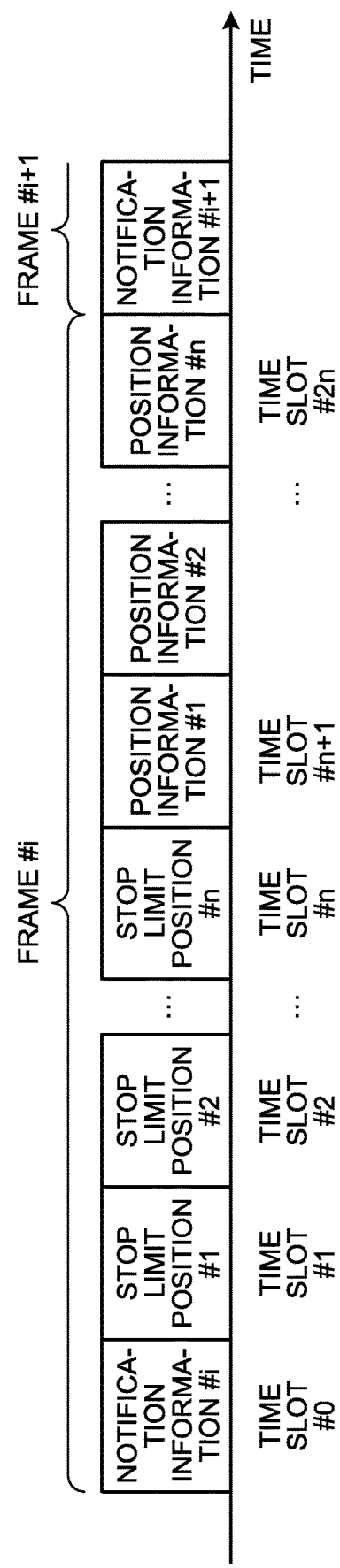
FIG. 8 is a diagram illustrating a frame configuration to be transmitted during the operation illustrated in FIG. 7.

FIG. 8 is a diagram illustrating a frame configuration to be transmitted during the operation illustrated in FIG. 7. When n mobile stations 2A are positioned within the cell formed by the base station 1A, an i-th frame # i transmitted between the base station 1A and the n mobile stations 2A includes notification information # i, n stop limit positions #1 to # n, and n pieces of position information #1 to # n. Each frame is constituted of time slots with a fixed time length. Notification information is stored in the leading time slot of each frame. The notification information, the stop limit positions, and the position information are transmitted respectively by using different time slots.

Figure 9:
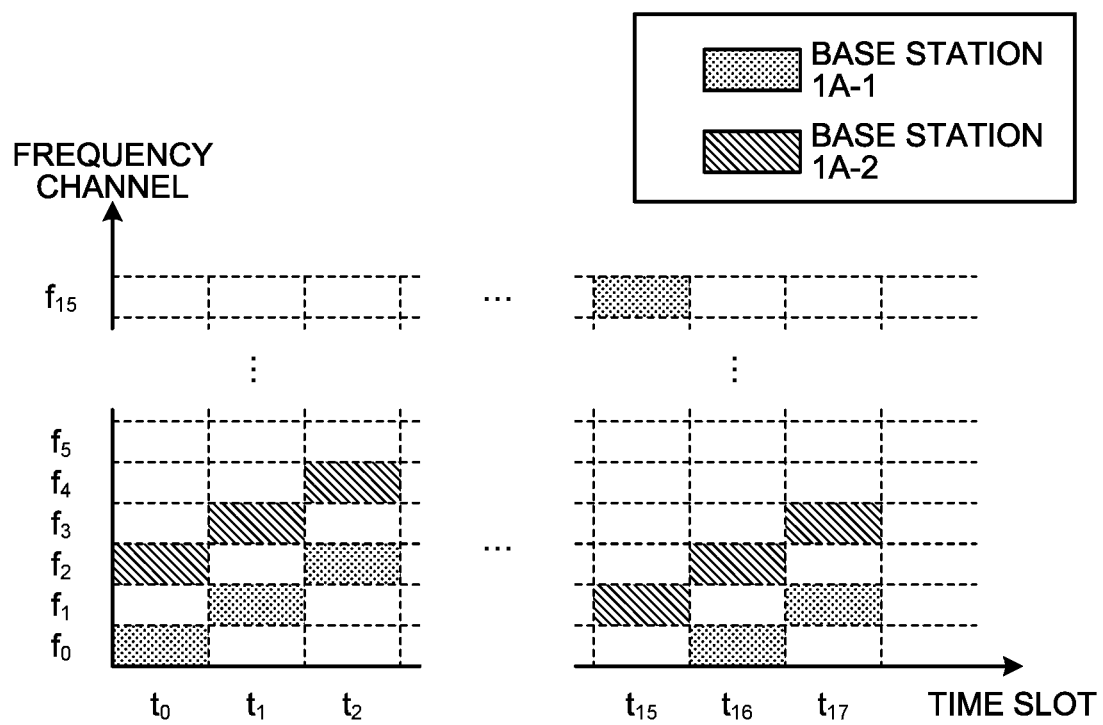
FIG. 9 is a diagram illustrating the concept of a method for allocating a frequency channel to each base station in the wireless communication system illustrated in FIG. 1.

FIG. 9 is a diagram illustrating the concept of a method for allocating a frequency channel to each base station 1A in the wireless communication system 10 illustrated in FIG. 1. In an example illustrated in FIG. 9, the number of candidate frequency channels is 16. The base station 1A-1 and the base station 1A-2 use different frequency channels from each other in the same time slot. Focusing on a particular base station 1A, a frequency channel to be used for each time slot is shifted one by one.

A hopping pattern is generated, in which frequency channels do not overlap with those in other hopping patterns in all the time slots. The maximum number of the hopping patterns that can be generated is equal to the number of candidate frequency channels. That is, in a case where there are 16 candidate frequency channels including $f_0$ to $f_{15}$, 16 hopping patterns can be generated. In this case, the interval between cells allocated with an identical hopping pattern having the same frequency channels in all the time slots is 16 cells at a maximum.

Depending on the system configuration, visibility may be poor between the base stations 1A, and thus the base stations 1A distanced from each other by 16 cells may be less likely to be interfered with by radio waves from each other. However, in the present embodiment in which the base stations 1A are located along the path 4 such as a railway track, the base station 1A is likely to be interfered with by radio waves from a remotely-located base station 1A. It is thus desirable to extend the interval between the cells allocated with an identical hopping pattern having the same frequency channels in all the time slots. Therefore, in the present embodiment, frequency channels to be used are allowed to partially overlap among cells, where the number of cells is equal to or smaller than the number of candidate frequency channels, and the interval between the cells, allocated with an identical hopping pattern having the same frequency channels in all the time slots, is greater than the number of candidate frequency channels.

Specifically, the channel-usage selection unit 15 selects a frequency channel that is different from a frequency channel to be used in the same time slot by an adjacent cell located at a cell interval, equal to or smaller than a predetermined first number of cells, from the cell used by the wireless communication unit 12 for wireless communication. The cell used by the wireless communication unit 12 for wireless communication is a cell formed by a base station 1 for the channel-usage selection unit 15 in the base station 1, while being a cell covering the position of the mobile station 2A for the channel-usage selection unit 15 in the mobile station 2A. At this time, the channel-usage selection unit 15 allows a selected frequency channel to overlap with a frequency channel to be used in the same time slot by a remote cell located at a cell interval greater than the first number of cells and equal to or smaller than the number of candidate frequency channels.

A frequency channel to be used is selected in the manner as described above, and thereby the selected frequency channel does not overlap with a frequency channel to be used by an adjacent cell, at which radio waves are more likely to reach, among cells where the number of cells is equal to or smaller than the number of candidate frequency channels. This can suppress radio wave interference. An overlapping frequency channel is used in a remote cell, at which radio waves are relatively less likely to reach, among cells where the number of cells is equal to or smaller than the number of candidate frequency channels. This can reduce the likelihood of the occurrence of radio wave interference. At this time, the channel-usage selection unit 15 defines the first number of cells in such a manner that there are a plurality of remote cells, and selects a frequency channel to be used so as to have an overlapping frequency channel with each of the remote cells in turn. The first number of cells is defined in this manner, and focusing on two of the remote cells, frequency channels do not overlap in all the time slots, and this makes it possible to suppress the occurrence of radio wave interference.

In order to transmit information accurately even when radio waves from the base station 1A using the same frequency channel cause interference, it is desirable to transmit the same information plural times over a plurality of frames. Although it is assumed that a time slot is allocated to a certain vehicle 3 within a single frame and the position of this time slot is the same among frames, if the number of candidate frequency channels is different from the number of time slots within a frame, the same vehicle 3 is allocated with a different frequency channel in each individual frame. As described above, the same vehicle 3 is allocated with a frequency channel that is changed in each individual frame. Thus, even under the circumstances where the quality of communication using a particular frequency channel is degraded, information can still be transmitted accurately by transmitting the same frame plural times.

In the example illustrated in FIG. 8, a single time slot is allocated to a single vehicle 3 within a single frame. However, the present invention is not limited to this example. It is allowable that a plurality of time slots are allocated to a single vehicle 3 within a single frame. Even in a case where a plurality of time slots are allocated to a single vehicle 3 within a single frame, a frequency channel to be used is changed in each individual time slot. Thus, interference immunity can be improved.

FIG. 10 is a diagram illustrating an example of the hopping pattern generated by the channel-usage selection unit 15 illustrated in FIG. 2 and FIG. 4. In the example illustrated in FIG. 10, the number of candidate frequency channels is 16. The number corresponding to each time slot and each cell shows the frequency channel number that identifies a frequency channel. Focusing on a cell #16, a frequency channel #0 for a time slot #0 and a frequency channel #12 for a time slot #4 overlap with those in a cell #0 distanced from the cell #16 by 16 cells. A frequency channel #7 for a time slot #1 overlaps with that in a cell #1 distanced from the cell #16 by 15 cells. A frequency channel #14 for a time slot #2 overlaps with that in a cell #2 distanced from the cell #16 by 14 cells. A frequency channel #5 for a time slot #3 overlaps with that in a cell #3 distanced from the cell #16 by 13 cells. In this manner, cells, allocated with a frequency channel that overlaps with a frequency channel allocated to the cell #16, are collected into a group of four cells including the cell #0 to the cell #3. Cells #4 to #15 are allocated with a frequency channel different from the frequency channel allocated to the cell #16 in the same time slot.

Next, descriptions are given of the method for selecting a frequency channel by the channel-usage selection unit 15 in order that frequency channels allocated to each of the cells form a hopping pattern as explained with reference to FIG. 10.

The channel-usage selection unit 15 uses the following equation (1) to select a frequency channel to be used for each time slot so as to generate a hopping pattern.

$$p[i,j]=\mod(j*d[m]+s[n],16) \qquad (1)$$

M is defined as the number of cells within the system, and N is defined as the number of slots within the frame. In this case, the value of the cell number i ranges from 0 to M−1, and the value of the time slot number j within a frame ranges from 0 to N−1. mod(A,B) is a remainder obtained after A is divided by B. Where the cell number i is divided by 16, that is the number of candidate frequency channels to calculate a quotient, m is a remainder obtained after the quotient is further divided by 2. The remainder m is expressed by the following equation (2). The value of m is 0 or 1. Because the value of m differs once every 16 cells, hopping patterns in cells distanced from each other by 16 cells include a different frequency channel. n is a remainder obtained after the cell number i is divided by 16, that is the number of candidate frequency channels. n is expressed by the following equation (3). The value of n is any of 0 to 15. The value of n differs in every cell.

$$m=\mod(i/16,2) \qquad (2)$$

$$n=\mod(i,16) \qquad (3)$$

d[m] represents a frequency channel interval between time slots. In this example, the value of d[m] is either 3 or 7 in accordance with the value of m. s[n] represents an offset of a hopping pattern between cells. In this example, the value of s[n] is any one of 0, 4, 8, 12, 1, 5, 9, 13, 3, 7, 11, 15, 2, 6, 10, and 14 in accordance with the value of n.

When the frequency channel interval d[m] between time slots is constant, the channel-usage selection unit 15 selects different frequency channels in the same time slot between different offsets s[n] by using the equation (1) described above. By changing d[m] at a cell interval equal to the number of candidate frequency channels, different frequency channels are selected in cells distanced from each other by the number of cells equal to the number of candidate frequency channels.

The equation (1) leads to the remainder of 16, that is the number of candidate frequency channels. Thus, the value of d[m] may range from 1 to 15. When a divisor of the number of candidate frequency channels, except 1, is selected, there is a frequency channel that is not used. Accordingly, a hopping pattern is repeated in a cycle shorter than the number of candidate frequency channels. Therefore, in this example, an odd number is used as the value of d[m]. A combination of the values of d[m] affects the ratio at which the same frequency channel is selected between cells with different values of d[m]. In a case where the value of d[m] is 3 or 7, the difference between these values is 4. This results in a difference of 16 frequency channels after every four time slots. When the remainder of 16 is obtained as expressed in the equation (1), the frequency channel relation between d[0](=3) and d[1](=7) is the same as the frequency channel relation shown four time slots before. That is, when frequency channels overlap in a certain time slot, frequency channels also overlap after four time slots.

That is, in a case where the difference in the value of d[m] is 4, cell-to-cell frequency channel overlap occurs with the cells that are different in the value of s[n] by a multiple of 4. As described above, in the present embodiment, s[n]=(0, 4, 8, 12, 1, 5, 9, 13, 3, 7, 11, 15, 2, 6, 10, 14), and the values of s[n] that are a multiple of 4 are arrayed collectively in adjacent cells. Due to this array, frequency channel overlap occurs at a rate of one out of four time slots for s[0] to s[3], while frequency channel overlap does not occur for s[4] to s[15].

In the above example, there is an overlapping frequency channel in one of four cells at a rate of one out of four time slots. By changing a combination of the values of d[m], there can be an overlapping frequency channel in one of eight cells at a rate of one out of eight time slots, or there can be an overlapping frequency channel in one of two cells at a rate of one out of two time slots.

In the wireless communication system 10, the value of d[m] and the value of s[n] are assigned to each base station 1A in advance. The channel-usage selection unit 15 in the base station 1A uses the value of d[m] and the value of s[n] given from the base-station control unit 14 to select a frequency channel to be used for each time slot to thereby generate a hopping pattern. The value of d[m] and the value of s[n] are included in the hopping information described above, and are transmitted to the mobile station 2A positioned within the cell of each base station 1A. The channel-usage selection unit 15 in the mobile station 2A selects a frequency channel to be used for each time slot by using the value of d[m] and the value of s[n] obtained via the mobile-station control unit 24 to thereby generate a hopping pattern.

The hopping pattern as illustrated in FIG. 10 can be generated by implementing the method described above. While FIG. 10 illustrates the time slot #0 to the time slot #15, a hopping pattern is generated in the same manner also in a time slot #16 and subsequent time slots. While FIG. 10 illustrates the cell #0 to the cell #31, the same hopping pattern as for the cell #0 is used again for a cell #32. That is, the interval between cells, in which frequency channels to be used overlap in all the time slots, is 32 cells that is greater than 16, that is the number of candidate frequency channels.

When there is a multiple relation between the number of time slots within a frame and the number of candidate frequency channels, a frequency channel allocated to a particular time slot within the frame overlaps between a plurality of frames. It is thus desirable to provide an offset to shift frequency channels to be allocated to each frame. In this case, assuming that the same information is transmitted plural times over a plurality of frames, the frequency channels overlap each other throughout the transmission of the same information between cells distanced from each other by 32 cells.

By increasing the number of arrays of d[m], it is possible to extend the interval between cells in which frequency channels to be used overlap in all the time slots, as compared to the above example.

In the above embodiment, selection of a frequency channel to be used is performed in parallel with the processing for wireless communication. However, the present invention is not limited to this example. The timing to select a frequency channel to be used is not limited to the above example so long as it is before starting wireless communication. It is allowable to select a frequency channel to be used in advance by using the method described above and hold a hopping pattern as a table, such that the channel-usage selection unit 15 selects a frequency channel for each time slot in accordance with the table. By generating the hopping pattern table in advance, the channel-usage selection unit 15 in the base station 1A and the mobile station 2A does not need to include a circuit intended for the calculation expressed by the equation (1) described above. This can simplify the circuit configuration.

As explained above, the base station 1A and the mobile station 2A, each of which is a wireless communication apparatus according to the first embodiment of the present invention, select a frequency channel that is different from a frequency channel to be used in the same time slot by an adjacent cell located at a cell interval, equal to or smaller than a predetermined first number of cells, from the cell used by the wireless communication unit 12 for wireless communication. The selected frequency channel is allowed to overlap with a frequency channel to be used in the same time slot by a remote cell located at a cell interval greater than the first number of cells and equal to or smaller than the number of candidate frequency channels. By using the frequency channel selected as described above, the interval between cells that use a hopping pattern in which frequency channels to be used overlap in all the time slots can be made greater than the number of candidate frequency channels. It is therefore possible to suppress radio wave interference within the system, and this makes it possible to achieve stabilized wireless communication.

Second Embodiment

Figure 11:
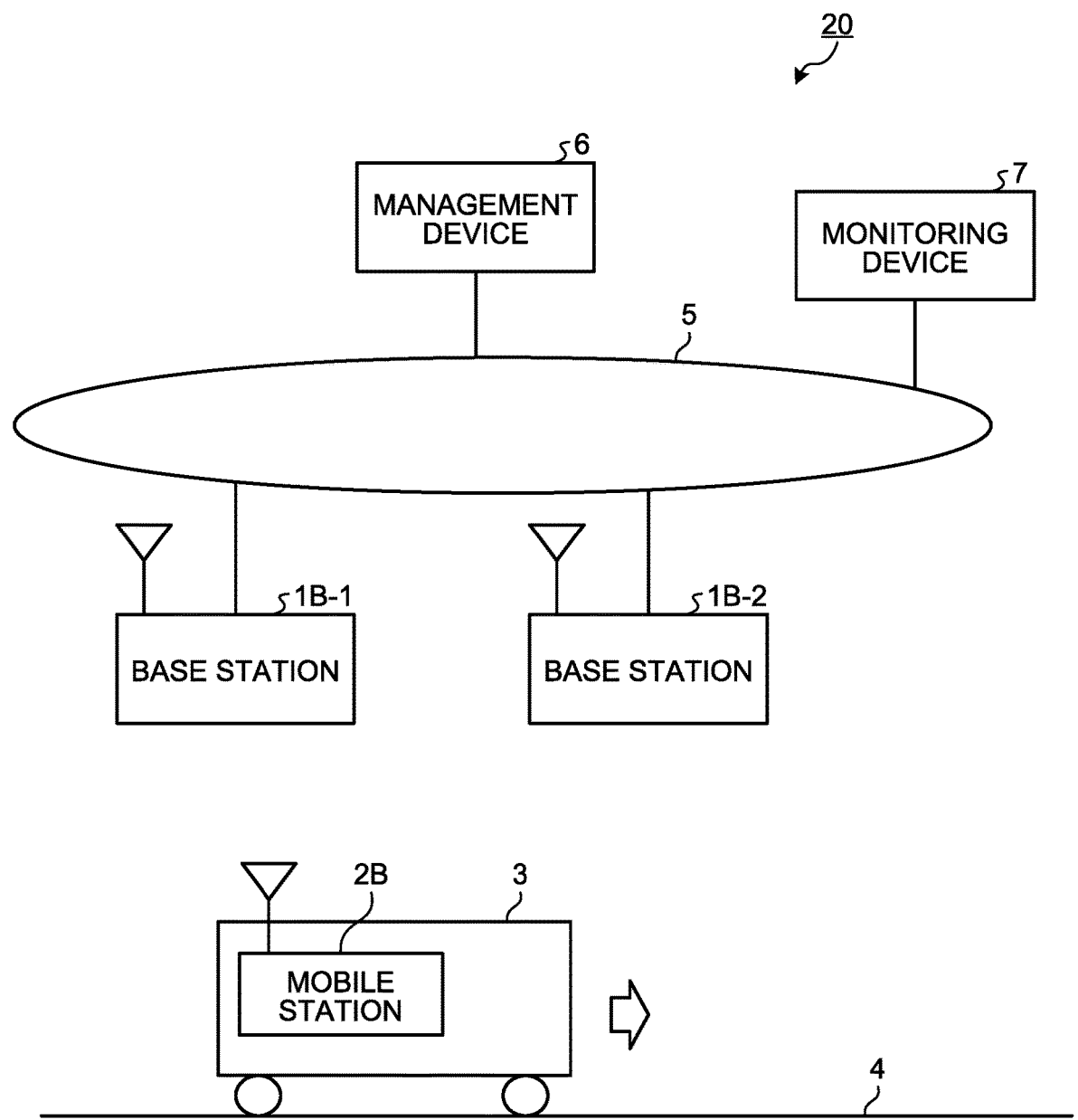
FIG. 11 is a diagram illustrating a configuration of a wireless communication system according to a second embodiment of the present invention.

FIG. 11 is a diagram illustrating a configuration of a wireless communication system 20 according to a second embodiment of the present invention. The wireless communication system 20 is configured to generate two hopping patterns and select a frequency channel for each time slot from the two generated hopping patterns, in addition to the frequency channel selection method according to the first embodiment. The wireless communication system 20 includes a base station 1B and a mobile station 2B respectively in place of the base station 1A and the mobile station 2A in the wireless communication system 10. The wireless communication system 20 includes a monitoring device 7 that monitors the state of communication quality within the system.

While FIG. 11 illustrates two base stations 1B-1 and 1B-2, the wireless communication system 20 can include three or more base stations 1B. While FIG. 11 illustrates a single vehicle 3 and a single mobile station 2B, the wireless communication system 20 can include a plurality of mobile stations 2B respectively installed in a plurality of vehicles 3.

The monitoring device 7 is connected to the wired network 5, and can communicate with the base station 1B through the wired network 5. Each of the base station 1B and the mobile station 2B has a function of measuring a quality value indicating the communication quality. The monitoring device 7 collects quality values measured respectively by the base station 1B and the mobile station 2B, and on the basis of the collected quality values, monitors the communication quality within the system, that is, the state of radio wave environment. When the monitoring device 7 detects that the communication quality is degraded, the monitoring device 7 issues a warning to a system administrator. The communication quality differs depending on the frequency channel to be used, and also changes in accordance with the measurement position within the cell. It is therefore desirable to manage the quality value along with the frequency channel to be used and the measurement position within the cell. For this reason, each of the base station 1B and the mobile station 2B transmits the frequency channel used and the measurement position to the monitoring device 7 at the time of transmitting the quality value to the monitoring device 7. The monitoring device 7 generates a database of the quality value of each frequency channel at each measurement position, and stores the quality value in the database.

Figure 12:
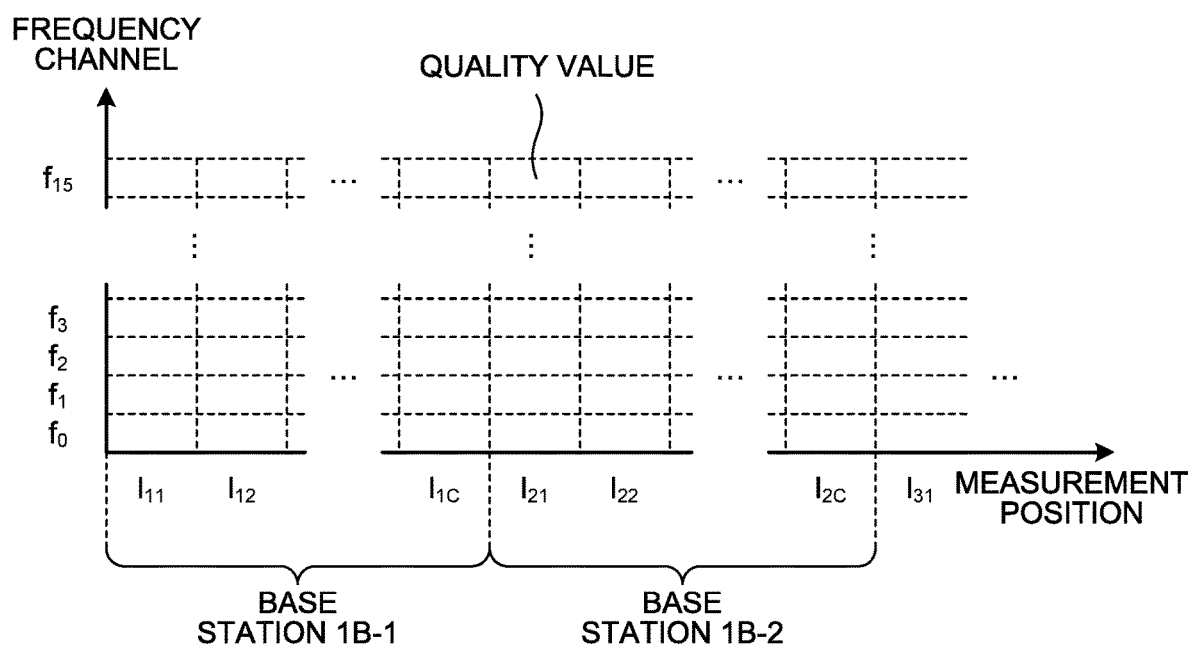
FIG. 12 is a diagram illustrating a configuration example of a database generated by a monitoring device illustrated in FIG. 11.

FIG. 12 is a diagram illustrating a configuration example of the database generated by the monitoring device 7 illustrated in FIG. 11. The horizontal axis in FIG. 12 represents a measurement position of the quality value within the cell of the base stations 1B. The vertical axis in FIG. 12 represents a frequency channel. The monitoring device 7 stores a received quality value in a storage area corresponding to the measurement position and the frequency channel that are associated with the received quality value. The measurement position is defined as a block obtained by dividing the cell of the base station 1B by a given distance. The measurement position is represented using this block. The monitoring device 7 manages the quality value for the base station 1B on a station-by-station basis. In the example in FIG. 12, blocks $1_{11}$ to $1_{1c}$ represent the position within the cell formed by the base station 1B-1, while blocks $1_{21}$ to $1_{2c}$ represent the position within the cell formed by the base station 1B-2.

The quality value stored in the database is data indicating the radio wave environment, that is, the communication quality at each measurement position within the cell. The data includes a signal-to-interference noise power ratio that is a ratio between signal and noise, a packet error rate that is the probability of receiving incorrect data on the reception side, and the like.

When the signal-to-interference noise power ratio is used, each base station 1B measures a reception power, while each mobile station 2B measures a reception power and an interference noise power. In order to monitor the communication quality when the mobile station 2B receives data transmitted by the base station 1B, and monitor the communication quality when the base station 1B receives data transmitted by the mobile station 2B, the monitoring device 7 can generate databases, each of which stores therein a quality value indicating each of these communication qualities.

The monitoring device 7 can update the database while averaging the quality values at the time of each measurement. As a method for the averaging, moving average using the quality values within a given period from the latest quality value may be employed, or a forgetting coefficient may be employed. The monitoring device 7 distributes the quality value stored in the generated database to the respective base stations 1B. Specifically, the monitoring device 7 distributes from the database the quality value stored in association with the block within the cell formed by each base station 1B to each base station 1B with the quality value being held associated with the block, that is, the measurement position and the frequency channel.

Figure 13:
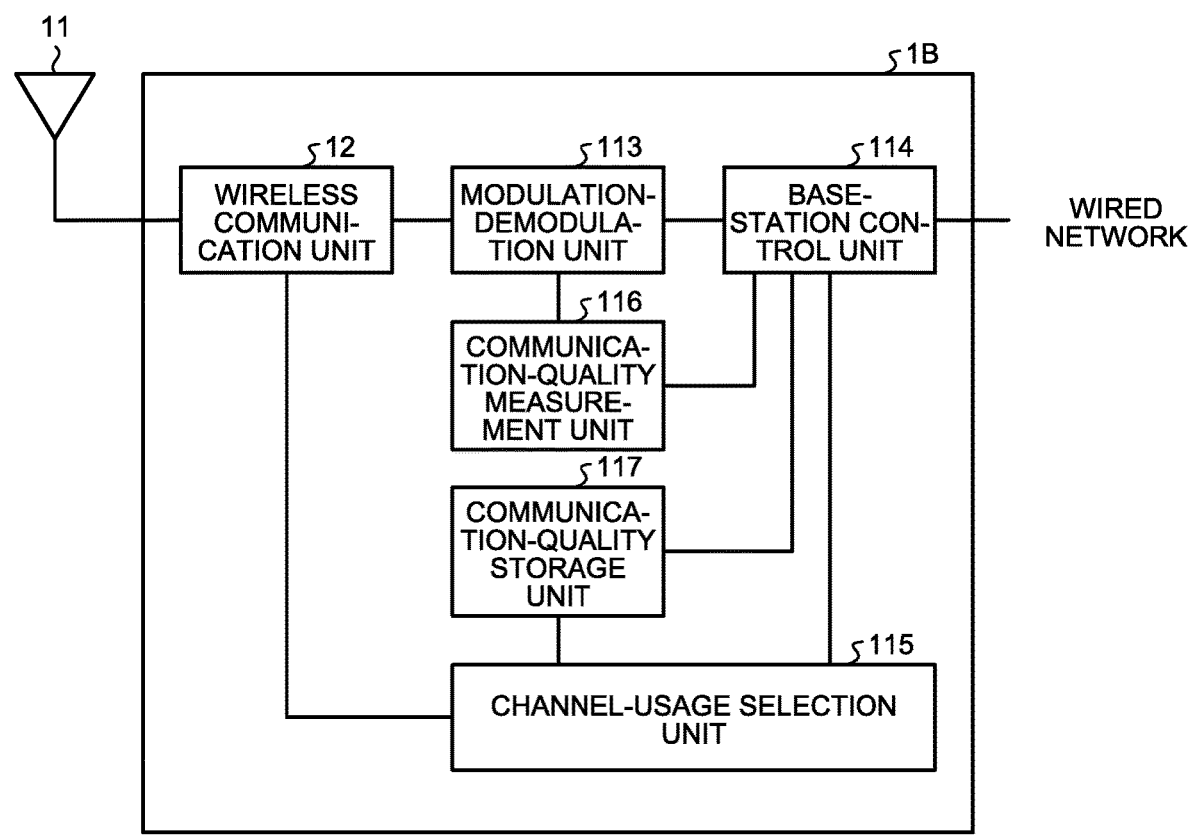
FIG. 13 is a diagram illustrating a configuration of a base station illustrated in FIG. 11.

FIG. 13 is a diagram illustrating a configuration of the base station 1B illustrated in FIG. 11. The base station 1B includes the communication antenna 11, the wireless communication unit 12, a modulation-demodulation unit 113, a base-station control unit 114, a channel-usage selection unit 115, a communication-quality measurement unit 116, and a communication-quality storage unit 117.

The functions of the communication antenna 11 and the wireless communication unit 12 are the same as those according to the first embodiment, and therefore descriptions thereof are omitted. The modulation-demodulation unit 113 has the same function as that of the modulation-demodulation unit 13. The base-station control unit 114 has the same function as that of the base-station control unit 14. The channel-usage selection unit 115 has the same function as that of the channel-usage selection unit 15. The functions of the modulation-demodulation unit 113, the base-station control unit 114, and the channel-usage selection unit 115 are different from those of the modulation-demodulation unit 13, the base-station control unit 14, and the channel-usage selection unit 15 in that these units perform processing using the quality value indicating the communication quality.

When the communication-quality measurement unit 116 receives a result of processing on a reception signal from the modulation-demodulation unit 113, the communication-quality measurement unit 116 uses the received processing result to measure a quality value indicating the communication quality of the reception signal. Specifically, the communication-quality measurement unit 116 measures radio wave environment when communication is not performed as an interference noise power, and measures a power value of the reception power. The communication-quality measurement unit 116 uses the measured power value of the reception signal and the measured interference noise power to calculate a signal-to-interference noise power ratio. The communication-quality measurement unit 116 outputs the measured quality value to the base-station control unit 114 along with the frequency channel used when the quality value is measured and the measurement position. The measurement position is a position of the mobile station 2B that has measured the interference noise power used to calculate the quality value.

The base-station control unit 114 transmits the quality value, the frequency channel, and the measurement position, which are output by the communication-quality measurement unit 116, to the monitoring device 7 through the wired network 5. When the base-station control unit 114 receives the quality value, the frequency channel, and the measurement position from the mobile station 2B through the communication antenna 11, the base-station control unit 114 transmits the received quality value to the monitoring device 7 through the wired network 5.

The base-station control unit 114 obtains a quality value associated with a measurement position and a frequency channel and distributed from the database by the monitoring device 7, and stores the obtained quality value in association with the measurement position and the frequency channel in the communication-quality storage unit 117. In this example, the monitoring device 7 is configured to collect quality values and thereafter distribute the collected quality values to each base station 1B. However, the present invention is not limited to this example. It is sufficient to generate a database of the quality value associated with the measurement position within the cell of the base station 1B and the frequency channel. It is allowable that each base station 1B generates a database for each base station 1B and transmits a copy of the database to the monitoring device 7.

The channel-usage selection unit 115 selects a frequency channel to be used on the basis of the quality value stored in the communication-quality storage unit 117. The channel-usage selection unit 115 extracts a plurality of frequency channels for each time slot, and selects one frequency channel that indicates the highest communication quality among the extracted frequency channels, on the basis of the quality value of each frequency channel. At this time, the channel-usage selection unit 115 stores therein selection information indicating the selected frequency channel, which is information that identifies a hopping pattern including the selected frequency channel.

Descriptions are given below of a method for extracting two frequency channels for each time slot by the channel-usage selection unit 115. The channel-usage selection unit 115 uses the following equation (4) to select two channels to be used for each time slot so as to generate two hopping patterns.

$$p[i,j,k]=\mathrm{mod}(j*d[k]+s[\mathrm{mod}(n+8*k,16],16) \quad (4)$$

k represents a value that identifies two hopping patterns to be generated. The value of k is either 0 or 1. Definitions of the symbols in the equation (4) except k are the same as those described in the first embodiment. The channel-usage selection unit 115 uses the equation (4) to extract two frequency channels for each time slot from among the candidate frequency channels so as to generate two hopping patterns. The equation (4) leads to the patterns in which d[k] is changed and s[n] is shifted by eight cells, as compared to the frequency channel selection method using the equation (1). In a case where the equation (4) is used to generate hopping patterns, frequency channel overlap does not occur with adjacent cells located at a cell interval of one to four cells, while frequency channel overlap occurs with four remote cells located at a cell interval of five to eight cells at a rate of one out of four time slots.

FIG. 14 is a diagram illustrating an example of a first hopping pattern generated by the channel-usage selection unit 115 illustrated in FIG. 13. FIG. 15 is a diagram illustrating an example of a second hopping pattern generated by the channel-usage selection unit 115 illustrated in FIG. 13. The hopping pattern illustrated in FIG. 14 and the hopping pattern illustrated in FIG. 15 are a pair of hopping patterns generated using the equation (4).

While FIG. 14 and FIG. 15 only illustrate the cells up to a cell #15, the hopping pattern in a cell #16 is identical to that in the cell #0. Focusing on the hopping pattern in the cell #8 in FIG. 14, referring to the pattern illustrated only in FIG. 14, the frequency channels overlap each other in the time slot #0 between the cell #8 and a cell distanced from the cell #8 by 16 cells. When a frequency channel #0 is selected in the cell #8, this frequency channel #0 overlaps between the cell #8 and the cell #0. Even in a case where either of the two hopping patterns is selected for each time slot in the manner as described above, frequency channel overlap does not occur with adjacent cells located at a cell interval of one to four cells, while frequency channel overlap is allowed with four remote cells located at a cell interval of five to eight cells at a rate of one out of four time slots. The interval between cells, in which frequency channels overlap over all the time slots, is 16 cells.

Normally, the number of candidate frequency channels is 16. When two frequency channels are extracted to generate two hopping patterns, eight hopping patterns, in which frequency channels do not overlap over all the time slots, can be generated. Due to this configuration, the same hopping pattern is repeated once in every eighth cell. In the present embodiment, frequency channel overlap with a remote cell is allowed so that the interval between the cells, in which frequency channels overlap over all the time slots, can be extended to 16 cells.

In the example described above, the frequency channel interval between time slots is constant regardless of the cell number. However, it is allowable to change the frequency channel interval between time slots in accordance with the cell number i in the same manner as in the first embodiment. In this case, similarly to the first embodiment, the interval between the cells, in which frequency channels overlap over all the time slots, can further be extended. In a case where the frequency channel interval between time slots is changed in accordance with the cell number i, the channel-usage selection unit 115 uses the following equation (5) to select a frequency channel to be used for each time slot so as to generate a hopping pattern.

$$p[i,j,k]=\mathrm{mod}(j*d[k,m]+s[\mathrm{mod}(n+8*k,16)],16) \quad (5)$$

When the equation (5) is used, m is a remainder obtained after the cell number i is divided by 16 to calculate a quotient and the quotient is further divided by 2 in the same manner as in the first embodiment. The remainder m is expressed by the equation (2) described above. The value of m is 0 or 1. In this case, the frequency channel interval d[k,m] between time slots is expressed by the following equation (6).

$$d[k,m]=(d[0,m],d[1,m])=((3,11),(7,15)) \quad (6)$$

FIG. 16 is a diagram illustrating a modification of the first hopping pattern generated by the channel-usage selection unit 115 illustrated in FIG. 13. FIG. 17 is a diagram illustrating a modification of the second hopping pattern generated by the channel-usage selection unit 115 illustrated in FIG. 13. The hopping pattern illustrated in FIG. 16 and the hopping pattern illustrated in FIG. 17 are a pair of hopping patterns generated using the equation (5).

Two hopping patterns illustrated in FIG. 16 and FIG. 17 are used so that the interval between the cells, in which frequency channels overlap in all the time slots, can be further extended to 32 cells as compared to using the equation (4).

The channel-usage selection unit 115 in the base station 1B selects one of the two frequency channels, then generates selection information indicating the selected frequency channel, and outputs the selection information to the base-station control unit 114. The base-station control unit 114 transmits the selection information to the mobile station 2B.

Figure 18:
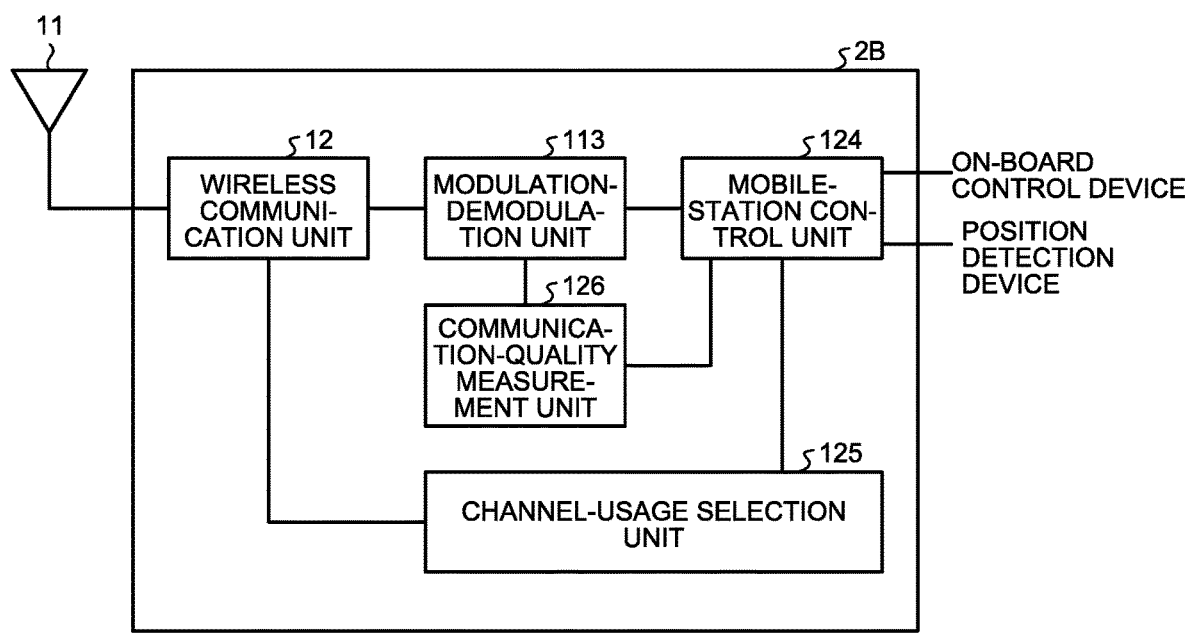
FIG. 18 is a diagram illustrating a configuration of a mobile station illustrated in FIG. 11.

FIG. 18 is a diagram illustrating a configuration of the mobile station 2B illustrated in FIG. 11. The mobile station 2B includes the communication antenna 11, the wireless communication unit 12, the modulation-demodulation unit 113, a communication-quality measurement unit 126, a mobile-station control unit 124, and a channel-usage selection unit 125.

The functions of the communication antenna 11 and the wireless communication unit 12 are the same as those according to the first embodiment. The function of the modulation-demodulation unit 113 is the same as that of the modulation-demodulation unit 113 in the base station 1B illustrated in FIG. 13. The mobile-station control unit 124 and the channel-usage selection unit 125 are different from the mobile-station control unit 24 and the channel-usage selection unit 15 in that these units perform processing using a quality value indicating the communication quality.

When the communication-quality measurement unit 126 receives a result of processing on a reception signal from the modulation-demodulation unit 113, the communication-quality measurement unit 126 uses the received processing result to measure a quality value indicating the communication quality of the reception signal. Specifically, the communication-quality measurement unit 126 measures a power value of the reception signal and an interference noise power that indicates radio wave environment when communication is not performed. The communication-quality measurement unit 126 calculates a signal-to-interference noise power ratio as a quality value by dividing the measured power value by the measured interference noise power. The communication-quality measurement unit 126 outputs the measured quality value, the measured interference noise power, the measurement position of the quality value, and the used frequency channel to the base-station control unit 124.

The mobile-station control unit 124 transmits the quality value, the measurement position, and the frequency channel, which are output by the communication-quality measurement unit 126, to the base station 1B. When the mobile-station control unit 124 receives selection information and hopping information from the base station 1B, the mobile-station control unit 124 outputs the selection information and the hopping information to the channel-usage selection unit 125.

The channel-usage selection unit 125 selects a frequency channel selected by the base station 1B for each time slot from among a plurality of frequency channels, and outputs the selected frequency channel to the wireless communication unit 12. When the channel-usage selection unit 125 receives the selection information and the hopping information from the mobile-station control unit 124, the channel-usage selection unit 125 generates a plurality of hopping patterns in the same manner as the channel-usage selection unit 115, and selects a frequency channel for each time slot in accordance with the selection information. Due to this configuration, it is possible to perform wireless communication using the same frequency channel as the base station 1B.

Descriptions are given of a hardware configuration for implementing the functions of the base station 1B illustrated in FIG. 13 and the mobile station 2B illustrated in FIG. 18. The modulation-demodulation unit 113, the base-station control unit 114, the channel-usage selection unit 115, the communication-quality measurement unit 116, the communication-quality storage unit 117, the mobile-station control unit 124, the channel-usage selection unit 125, and the communication-quality measurement unit 126 are equivalent to a processing circuit. It is allowable that this processing circuit is either dedicated hardware or a processing circuit that uses computer programs.

When dedicated hardware is used, the processing circuit is the processing circuit 90 illustrated in FIG. 5. When computer programs are used, the processing circuit is the processing circuit 91 illustrated in FIG. 6. It is also allowable that the functions of the base station 1B and the mobile station 2B are implemented by using the processing circuit 90 that is dedicated hardware in combination with the processing circuit 91 that uses computer programs.

Next, an operation of the wireless communication system 20 illustrated in FIG. 11 is described. FIG. 19 is a sequence diagram illustrating the operation of the wireless communication system 20 illustrated in FIG. 11.

An operation of transmitting position information and a stop limit position between the base station 1B, the mobile station 2B, and the management device 6 is performed in the same manner as in the first embodiment, and thus descriptions thereof are omitted. Differences from the first embodiment are mainly explained below. Explanations of the operation, when having already been described above in detail, are omitted below. In practice, the wireless communication system 20 includes a plurality of base stations 1B and a plurality of mobile stations 2B, each of which is positioned within the cell of each of the base stations 1B. However, for the sake of simplicity, FIG. 19 only illustrates one base station 1B and one mobile station 2B.

The communication-quality measurement unit 126 in the mobile station 2B measures a quality value in a given cycle (Step S201). The mobile station 2B transmits the measured quality value to the base station 1B through wireless communication (Step S202). The base-station control unit 114 in the base station 1B transmits the quality value received from the mobile station 2B to the monitoring device 7 through the wired network 5 (Step S203).

The communication-quality measurement unit 116 in the base station 1B measures a quality value in a given cycle and outputs the measured quality value to the base-station control unit 114 (Step S204). The base-station control unit 114 in the base station 1B transmits the quality value to the monitoring device 7 through the wired network 5 (Step S205).

The monitoring device 7 uses the received quality value to update a database of the quality value (Step S206). The monitoring device 7 transmits the database of the quality value to the base station 1B (Step S207).

When the base station 1B stores the database of the quality value transmitted by the monitoring device 7 in the communication-quality storage unit 117, the channel-usage selection unit 115 generates two frequency channels for each time slot (Step S208). On the basis of the quality value, the channel-usage selection unit 115 selects one of the two frequency channels for each time slot (Step S209). The base station 1B generates selection information indicating the frequency channel selected at Step S209, and transmits the generated selection information to the mobile station 2B (Step S210). The base station 1B can store the selection information, d[k], and s[n] in the notification information described in the first embodiment and can transmit the notification information to the mobile station 2B.

The channel-usage selection unit 125 in the mobile station 2B uses d[k] and s[n] received from the base station 1B to generate two hopping patterns, and selects one frequency channel for each time slot from the two hopping patterns by using the selection information to generate one hopping pattern (Step S211).

The configurations described in the above embodiments are only examples of the content of the present invention. The configurations can be combined with other well-known techniques, and part of each of the configurations can be omitted or modified without departing from the scope of the present invention.

For example, in the above embodiments, wireless communication is performed using an ISM band. However, the present invention is not limited to this example. The technique of the present invention is applicable to a system that uses any wireless band where interference with another system may occur.

In the above embodiments, the wireless train control system has been described in which the path 4 is a railway track, the vehicle 3 is a train, and control information for executing train traffic control, speed control, and the like is transmitted from a base station to a mobile station through wireless communication. However, the present invention is not limited to this example. It is allowable that the path 4 is a road such as an expressway, the vehicle 3 is an automobile, and the base station is a road-to-vehicle communication system included in a roadside unit. In a case where an automobile has an automated driving function, control information for the automobile is transmitted through wireless communication in the same manner as in the above embodiments. Information transmitted from the base station to the mobile station may not be used for controlling the vehicle 3, but may be simply displayed on a display device installed in the vehicle 3.

In the second embodiment described above, two frequency channels are extracted for each time slot in parallel with the processing for wireless communication. However, the present invention is not limited to this example. It is allowable that the same method as described above in the second embodiment is used to create two hopping patterns in advance and the channel-usage selection unit 115 holds therein the two hopping patterns. In this case, the channel-usage selection unit 115 selects a frequency channel to be used for each time slot from the two hopping patterns generated in advance on the basis of a quality value. By generating a table of hopping patterns in advance, the channel-usage selection unit 115 in the base station 1B and the channel-usage selection unit 125 in the mobile station 2B do not need to include a circuit intended for the calculation expressed by the equation (4) or the equation (5) described above. This can simplify the circuit configuration.

As explained above, the base station 1B and the mobile station 2B, each of which is a wireless communication apparatus according to the second embodiment of the present invention, select a frequency channel that is different from a frequency channel to be used in the same time slot by an adjacent cell located at a cell interval, equal to or smaller than the predetermined first number of cells, from the cell used by the wireless communication unit 12 for wireless communication in the same manner as in the first embodiment. The selected frequency channel is allowed to overlap with a frequency channel to be used in the same time slot by a remote cell located at a cell interval greater than the first number of cells and equal to or smaller than the number of candidate frequency channels. By using the frequency channel selected as described above, the interval between cells that use a hopping pattern, in which frequency channels to be used overlap in all the time slots, can be extended as compared to a case where frequency channel overlap is not allowed. It is therefore possible to suppress radio wave interference within the system, and this makes it possible to achieve stabilized wireless communication.

On the basis of the quality value, the base station 1B and the mobile station 2B select a frequency channel for each time slot from the two frequency channels selected in the manner as described above. Due to this operation, the base station 1B and the mobile station 2B can select a frequency channel with a currently better radio-wave status. It is therefore possible to further suppress radio wave interference, and this makes it possible to achieve stabilized wireless communication.

In the first embodiment and the second embodiment described above, a frequency channel to be used in each cell is selected by closed processing only within the base station 1A and the base station 1B. In a case where a single device within a system selects a frequency channel to be used by a plurality of base stations 1A and 1B included in the system, there is a problem with a response time to collecting train position information and distributing a selected hopping pattern. In contrast to this, in the first embodiment and the second embodiment of the present invention, it is unnecessary for selection of a frequency channel to transmit and receive a large volume of data between a plurality of devices. Accordingly, it is unnecessary to take into account the response time, which improves the responsiveness to changing over the frequency channels.

REFERENCE SIGNS LIST

1A, 1A-1, 1A-2, 1B, 1B-1, 1B-2 base station, 2A, 2A-1, 2A-2, 2A-n, 2B mobile station, 3 vehicle, 4 path, 5 wired network, 6 management device, 7 monitoring device, 10, 20 wireless communication system, 11 communication antenna, 12 wireless communication unit, 13, 113 modulation-demodulation unit, 14, 114 base-station control unit, 15, 115, 125 channel-usage selection unit, 24, 124 mobile-station control unit, 31 on-board control device, 32 position detection device, 90, 91 processing circuit, 92 processor, 93 memory, 116, 126 communication-quality measurement unit, 117 communication-quality storage unit.

The invention claimed is:

1. A wireless communication apparatus comprising:
a channel-usage selection circuitry to select one frequency channel for each time slot from a plurality of predetermined candidate frequency channels; and
a wireless communication circuitry to perform wireless communication by using the frequency channel selected by the channel-usage selection circuitry, wherein
the channel-usage selection circuitry selects the frequency channel that is different from a frequency channel to be used in a same time slot by an adjacent cell located at a first cell interval, equal to or smaller than predetermined first number of cells, from a cell used for the wireless communication, and allows the frequency channel selected to overlap with a frequency channel to be used in a same time slot by a remote cell located at a second cell interval, greater than the first number of cells and equal to or smaller than number of the predetermined candidate frequency channels, from the cell used for the wireless communication,
wherein a cell interval between the cell used by the wireless communication circuitry for the wireless communication and a cell that uses the same frequency channel in all time slots is greater than the number of the predetermined candidate frequency channels.

2. The wireless communication apparatus according to claim 1, wherein the channel-usage selection circuitry uses a frequency channel interval between the time slots and an offset between cells to determine the frequency channel to be used.

3. The wireless communication apparatus according to claim 2, wherein the channel-usage selection circuitry uses two different frequency channel intervals between the time slots, and uses the offset between cells to extract the plurality of the predetermined candidate frequency channels for each of the time slots, and select one of the frequency channels on a basis of a quality value indicating communication quality of each of the frequency channels.

4. The wireless communication apparatus according to claim 1, wherein the wireless communication apparatus is located along a predetermined path, and is any one of plural base stations, each of which forms a corresponding cell, or is a mobile station moving along the predetermined path, and the wireless communication is performed between one of the plural base stations and the mobile station positioned within the cell formed by the one of the plural base stations.

5. The wireless communication apparatus according to claim 4, wherein
the wireless communication apparatus is the one of the plural base stations, and
the channel-usage selection circuitry uses a frequency channel interval between the time slots and an offset between cells, the frequency channel interval and the offset being allocated to each of the plural base stations in advance, to select the frequency channel to be used.

6. The wireless communication apparatus according to claim 4, wherein
the wireless communication apparatus is the mobile station, and
the channel-usage selection circuitry obtains a frequency channel interval between the time slots and an offset between cells, the frequency channel interval and the offset being allocated to each of the base stations in advance by the plural base stations that is a counterpart device for the wireless communication, and uses the obtained frequency channel interval between the time slots and the obtained offset between cells to select the frequency channel to be used.

7. The wireless communication apparatus according to claim 3, wherein
the wireless communication apparatus is a base station that forms a corresponding cell, and
the wireless communication circuitry notifies selection information indicating the frequency channel selected for said each of the time slot by the channel-usage selection circuitry to a mobile station positioned within the cell formed by the base station.

8. The wireless communication apparatus according to claim 4, wherein the predetermined path is a railway track, and the mobile station is installed in a train running on the railway track.

9. The wireless communication apparatus according to claim 1, wherein the channel-usage selection circuitry includes a table of a hopping pattern in which a frequency channel to be used for said each time slot is set, and selects the frequency channel to be used in accordance with the table.

10. A wireless communication system comprising:
a base station located along a predetermined path; and
a mobile station positioned within a cell formed by the base station and moving along the predetermined path, wherein
the wireless communication system performs wireless communication between the base station and the mobile station by changing over a frequency channel to be used for each time slot among a plurality of predetermined candidate frequency channels, and
each of the base station and the mobile station selects a frequency channel that is different from a frequency channel to be used in a same time slot by an adjacent cell located at a first cell interval, equal to or smaller than predetermined first number of cells, from a cell used for the wireless communication, and allows the frequency channel selected to overlap with a frequency channel to be used in a same time slot by a remote cell located at a second cell interval, greater than the first number of cells and equal to or smaller than number of the predetermined candidate frequency channels, from the cell used for the wireless communication,
wherein a cell interval between the cell used for the wireless communication and a cell that uses the same frequency channel in all time slots is greater than the number of the predetermined candidate frequency channels.

11. A wireless communication method for performing wireless communication between a base station located along a predetermined path and a mobile station positioned within a cell formed by the base station and moving along the predetermined path by changing over a frequency channel to be used for each time slot among a plurality of predetermined candidate frequency channels, wherein
the base station and the mobile station selects a frequency channel that is different from a frequency channel to be used in a same time slot by an adjacent cell located at a first cell interval, equal to or smaller than predetermined first number of cells, from a cell used for the wireless communication, and allows the frequency channel selected to overlap with a frequency channel to be used in a same time slot by a remote cell located at a second cell interval, greater than the first number of cells and equal to or smaller than number of the predetermined candidate frequency channels, from the cell used for the wireless communication,
wherein a cell interval between the cell used for the wireless communication and a cell that uses the same frequency channel in all time slots is greater than the number of the predetermined candidate frequency channels.

12. A control circuit to control a wireless communication apparatus to perform wireless communication by using a frequency channel selected from among a plurality of predetermined candidate frequency channels, wherein
the control circuit causes the wireless communication apparatus to perform a process of selecting a frequency channel that is different from a frequency channel to be used in a same time slot by an adjacent cell located at a first cell interval, equal to or smaller than predetermined first number of cells, from a cell used for the wireless communication, and to allow the frequency channel selected to overlap with a frequency channel to be used in a same time slot by a remote cell located at a second cell interval, greater than the first number of cells and equal to or smaller than number of the predetermined candidate frequency channels, from the cell used for the wireless communication, and
a cell interval between the cell used by the wireless communication apparatus for the wireless communication and a cell that uses the same frequency channel in all time slots is greater than the number of the predetermined candidate frequency channels.

13. A non-transitory computer-readable recording medium having stored therein a program for controlling a wireless communication apparatus to perform wireless communication by using a frequency channel selected from among a plurality of predetermined candidate frequency channels, wherein the program causes the wireless communication apparatus to perform a process of selecting a frequency channel that is different from a frequency channel to be used in a same time slot by an adjacent cell located at a first cell interval, equal to or smaller than predetermined first number of cells, from a cell used for the wireless communication, and allowing the frequency channel selected to overlap with a frequency channel to be used in a same time slot by a remote cell located at a second cell interval, greater than the first number of cells and equal to or smaller than number of the predetermined candidate frequency channels, from the cell used for the wireless communication, and a cell interval between the cell used by the wireless communication apparatus for the wireless communication and a cell that uses the same frequency channel in all time slots is greater than the number of the predetermined candidate frequency channels.

* * * * *